US011108953B2

(12) United States Patent
Dong et al.

(10) Patent No.: US 11,108,953 B2
(45) Date of Patent: Aug. 31, 2021

(54) PANORAMIC PHOTO SHOOTING METHOD AND APPARATUS

(71) Applicant: Huawei Technologies Co., Ltd., Shenzhen (CN)

(72) Inventors: Chen Dong, Beijing (CN); Xin Ding, Beijing (CN); Wenmei Gao, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/639,655

(22) PCT Filed: Aug. 18, 2017

(86) PCT No.: PCT/CN2017/098106
§ 371 (c)(1),
(2) Date: May 11, 2020

(87) PCT Pub. No.: WO2019/033411
PCT Pub. Date: Feb. 21, 2019

(65) Prior Publication Data
US 2020/0336660 A1 Oct. 22, 2020

(51) Int. Cl.
H04N 7/00 (2011.01)
H04N 5/232 (2006.01)
G06K 9/00 (2006.01)

(52) U.S. Cl.
CPC ..... *H04N 5/23238* (2013.01); *G06K 9/00248* (2013.01); *G06K 9/00255* (2013.01); *H04N 5/23219* (2013.01); *H04N 5/23245* (2013.01); *H04N 5/232935* (2018.08); *H04N 5/232939* (2018.08)

(58) Field of Classification Search
CPC ............ H04N 5/232935; H04N 5/232; H04N 5/23238; H04N 5/232939; H04N 5/23245; H04N 5/23219; G06K 9/00255; G06K 9/22; G06K 9/00248
USPC ...... 348/36, 39, 46, 47, 48, 49, 51; 386/210, 386/223, 224
See application file for complete search history.

(56) References Cited

U.S. PATENT DOCUMENTS

| 2008/0020795 | A1 | 1/2008 | Kim |
| 2009/0115840 | A1* | 5/2009 | Kim ............... H04N 5/23238 348/36 |
| 2009/0185056 | A1 | 7/2009 | Okamoto et al. |
| 2010/0026872 | A1 | 2/2010 | Jiang |
| 2015/0035941 | A1 | 2/2015 | Chen et al. |

(Continued)

FOREIGN PATENT DOCUMENTS

| CN | 101110906 A | 1/2008 |
| CN | 101639610 B | 3/2011 |
| CN | 102938815 A | 2/2013 |

(Continued)

*Primary Examiner* — Robert Chevalier
(74) *Attorney, Agent, or Firm* — Conley Rose, P.C.

(57) ABSTRACT

A panoramic photo shooting method and apparatus related to the field of communications technologies include detecting, by a terminal, an input operation used to turn on a camera, turning on, by the terminal, the camera in response to the input operation, displaying, by the terminal, a preview picture obtained by the camera, and displaying, by the terminal in the preview picture, a prompt for entering a panoramic photo shooting mode.

20 Claims, 20 Drawing Sheets

(56) References Cited

U.S. PATENT DOCUMENTS

2016/0112632 A1    4/2016  Du et al.

FOREIGN PATENT DOCUMENTS

| | | |
|---|---|---|
| CN | 103595913 A | 2/2014 |
| CN | 103747184 A | 4/2014 |
| CN | 104104867 A | 10/2014 |
| CN | 104349038 A | 2/2015 |
| CN | 104660908 A | 5/2015 |
| CN | 104902170 A | 9/2015 |
| CN | 104994291 A | 10/2015 |
| CN | 104994292 A | 10/2015 |
| CN | 105007411 A | 10/2015 |
| CN | 105049711 A | 11/2015 |
| CN | 105657257 A | 6/2016 |
| CN | 105979149 A | 9/2016 |
| CN | 106210539 A | 12/2016 |
| CN | 106331336 A | 1/2017 |
| CN | 106375660 A | 2/2017 |
| CN | 106454139 A | 2/2017 |
| CN | 106713769 A | 5/2017 |

\* cited by examiner (a)

(b)

(c)

PANORAMIC PHOTO SHOOTING METHOD AND APPARATUS

CROSS-REFERENCE TO RELATED APPLICATIONS

This application is a U.S. National Stage of International Patent Application No. PCT/CN2017/098106 filed Aug. 18, 2017, which is hereby incorporated by reference in its entirety.

TECHNICAL FIELD

Embodiments of this application relate to the field of communications technologies, and in particular, to a panoramic photo shooting method and an apparatus.

BACKGROUND

Panoramic photo shooting (panorama) generally refers to a shooting mode in which a group of photos, obtained by shooting in a range of a normal angle of view (for example, a horizontal direction of 90 degrees) or a larger range of a field of view (for example, a horizontal direction of 180 degrees or even 360 degrees) that meets human eyes, are combined into one wide-angle image.

A panoramic photo obtained by using panoramic photo shooting has a wider angle of view, which can bring a better visual effect to a user. Therefore, a panoramic photo shooting mode is widely used in various types of intelligent terminals such as a mobile phone. However, the panoramic photo shooting mode is usually used after the user enters a shooting mode. For example, as shown in FIG. 1, after tapping a camera button and entering a shooting preview picture, the user needs to select and enter a corresponding shooting mode in a setting interface 11, for example, a portrait mode, a video mode, a time-lapse mode, or a panorama mode. This method for switching shooting modes is relatively cumbersome. In addition, for an unprofessional user for photo shooting, it is difficult to select a shooting mode that meets a current shooting requirement. Consequently, a relatively poor shooting effect is obtained.

SUMMARY

Embodiments of this application provide a panoramic photo shooting method and an apparatus, to automatically recommend, based on a shooting scenario, a user to enter a panoramic photo shooting mode, thereby simplifying a shooting procedure and improving a shooting effect.

To achieve the foregoing objectives, the following technical solutions are used in the embodiments of this application.

According to a first aspect, an embodiment of this application provides a panoramic photo shooting method, including: when detecting an input operation used to turn on a camera, a terminal responds to the input operation, and the terminal may turn on the camera to obtain a current preview picture and display the current preview picture; in addition, the terminal may further display, in the preview picture, a prompt for entering a panoramic photo shooting mode, to provide a user with a quick portal for entering the panoramic photo shooting mode, so that the user uses the panoramic photo shooting mode for shooting.

In a possible design method, after the terminal displays, in the preview picture, the prompt for entering the panoramic photo shooting mode, the method may further include: detecting another input operation used to enter the panoramic photo shooting mode; in response to the another input operation, the terminal may display a preview picture in the panoramic photo shooting mode, so as to switch to the panoramic photo shooting mode.

In a possible design method, after obtaining the preview picture, the terminal may further determine whether incomplete human face information exists in an edge area (namely, a preset area near a preview box) of the preview picture. When incomplete human face information exists, it indicates that, in this case, a wider angle of shooting is required to display faces of one or more shot users in a preview box. In this case, the terminal may display the prompt for entering the panoramic photo shooting mode, so that a better shooting effect is obtained.

In a possible design method, when no incomplete human face information exists in the edge area of the preview picture, the method further includes: displaying, by the terminal, another preview picture that is adjacent to the preview picture and that is obtained by the camera of the terminal; when human face information in the another preview picture increases in comparison with the human face information in the preview picture, it indicates that, in this case, one or more new users enter the shooting picture; and then the terminal may prompt the user to enter the panoramic photo shooting mode, so that all faces of a plurality of users are displayed in the preview box by using a wider-angle panoramic photo shooting method, thereby improving a shooting effect.

In a possible design method, that the terminal determines whether incomplete human face information exists in the edge area of the preview picture specifically includes: extracting, by the terminal, human eye information in the edge area of the preview picture; and if human eye information is extracted, the terminal may determine that incomplete human face information exists in the edge area of the preview picture; or if no human eye information is extracted, determining, by the terminal, that no incomplete human face information exists in the edge area of the preview picture.

For another example, the terminal may perform mirror symmetry on the edge area in the preview picture to obtain a mirror area after mirror symmetry. In this case, an image in the mirror area is a mirror image of an image in the edge area. Further, the terminal detects whether complete human face information exists in the edge area and the mirror area. If complete human face information exists, the terminal may determine that incomplete human face information exists in the edge area of the preview picture; or if no complete human face information exists, the terminal determines that no incomplete human face information exists in the edge area of the preview picture.

Accuracy of recognizing a complete human face by the terminal is higher than accuracy of recognizing a part of a human face by the terminal. Therefore, according to the foregoing method for determining, through mirror symmetry, whether incomplete human face information exists in the edge area, accuracy of recognizing an incomplete human face in the edge area may be improved.

In a possible design method, after the terminal displays the another preview picture obtained by the camera, the method further includes: comparing, by the terminal, the preview picture with the another preview picture, to determine whether the human face information in the another preview picture increases.

For example, when a quantity of human faces in the another preview picture is greater than a quantity of human faces in the preview picture, the terminal may determine that the human face information in the another preview picture increases; otherwise, the terminal determines that the human face information in the another preview picture does not increase. Alternatively, when a quantity of human eyes in the another preview picture is greater than a quantity of human eyes in the preview picture, the terminal may determine that the human face information in the another preview picture increases; otherwise, the terminal determines that the human face information in the another preview picture does not increase. In other words, when a new human face or a human eye appears in two consecutive preview pictures, it may be considered that the human face information in the another preview picture increases, and then the terminal is triggered to prompt the user to enter the panoramic photo shooting mode.

In a possible design method, that the terminal prompts the user to enter the panoramic photo shooting mode includes: displaying, by the terminal, a shortcut for entering the panoramic photo shooting mode. To facilitate an operation of the user, the terminal may use a gesture or a button that can be operated by the user with one hand as a shortcut for switching to the panoramic photo shooting mode.

In a possible design method, after the terminal displays the preview picture obtained by the camera, the method further includes: when a quantity of human faces in the preview picture is greater than a first threshold, prompting, by the terminal, the user to enter the panoramic photo shooting mode; or when the quantity of human faces in the preview picture is greater than a second threshold (the second threshold is greater than the first threshold), it indicates that a shooting distance between the terminal and a shot user is relatively long, and the terminal may shoot a plurality of users at the same time without entering the panoramic photo shooting mode. Therefore, the terminal may cancel the prompt for entering the panoramic photo shooting mode.

According to a second aspect, an embodiment of this application provides a terminal, including: a detection unit, configured to detect an input operation used to turn on a camera; an execution unit, configured to turn on the camera in response to the input operation; and a display unit, configured to: display a preview picture obtained by the camera; and display, in the preview picture, a prompt for entering a panoramic photo shooting mode.

In a possible design method, the detection unit is further configured to detect another input operation used to enter the panoramic photo shooting mode; and the display unit is further configured to display a preview picture in the panoramic photo shooting mode in response to the another input operation, to enter the panoramic photo shooting mode.

In a possible design method, the terminal further includes a determining unit, and the determining unit is configured to determine whether incomplete human face information exists in an edge area of the preview picture, where at least one boundary of the edge area overlaps a boundary of the preview picture, and an area of the edge area is less than a preset value; and the display unit is specifically configured to: when incomplete human face information exists in the edge area of the preview picture, display, in the preview picture, the prompt for entering the panoramic photo shooting mode.

In a possible design method, the display unit is further configured to: display another preview picture obtained by the camera, where the another preview picture is a preview frame adjacent to the preview picture; and when human face information in the another preview picture increases in comparison with the human face information in the preview picture, display, in the another preview picture, the prompt for entering the panoramic photo shooting mode.

In a possible design method, the execution unit is further configured to extract human eye information in the edge area of the preview picture; and the determining unit is specifically configured to: if human eye information is extracted, determine that incomplete human face information exists in the edge area of the preview picture; or if no human eye information is extracted, determine that no incomplete human face information exists in the edge area of the preview picture.

In a possible design method, the execution unit is further configured to: perform mirror symmetry on the edge area to obtain a mirror area after minor symmetry, where an image in the mirror area is a mirror image of an image in the edge area; and detect whether complete human face information exists in the edge area and the mirror area; and the determining unit is specifically configured to: if complete human face information exists, determine that incomplete human face information exists in the edge area of the preview picture; or if no complete human face information exists, determine that no incomplete human face information exists in the edge area of the preview picture.

In a possible design method, the determining unit is configured to compare the preview picture with the another preview picture, to determine whether the human face information in the another preview picture increases.

In a possible design method, the determining unit is specifically configured to: when a quantity of human faces in the another preview picture is greater than a quantity of human faces in the preview picture, determine that the human face information in the another preview picture increases; otherwise, determine that the human face information in the another preview picture does not increase; alternatively, when a quantity of human eyes in the another preview picture is greater than a quantity of human eyes in the preview picture, determine that the human face information in the another preview picture increases; otherwise, determine that the human face information in the another preview picture does not increase.

In a possible design method, the display unit is further configured to: when a quantity of human faces in the preview picture is greater than a first threshold, display, in the preview picture, a prompt for entering the panoramic photo shooting mode; or when a quantity of human faces in the preview picture is greater than a second threshold, cancel the prompt for entering the panoramic photo shooting mode, where the second threshold is greater than the first threshold.

In a possible design method, the display unit is specifically configured to display, in the preview picture, a shortcut for entering the panoramic photo shooting mode.

According to a third aspect, an embodiment of this application provides a terminal, including a processor, a display, and a camera, where the processor is configured to: detect an input operation used to turn on the camera; turn on the camera in response to the input operation; display, on the display, a preview picture obtained by the camera; and display, in the preview picture displayed on the display, a prompt for entering a panoramic photo shooting mode.

In a possible design method, the processor is further configured to: detect another input operation used to enter the panoramic photo shooting mode; and display, in response to the another input operation, a preview picture in the panoramic photo shooting mode on the display.

In a possible design method, the processor is further configured to: determine whether incomplete human face information exists in an edge area of the preview picture, where at least one boundary of the edge area overlaps a boundary of the preview picture, and an area of the edge area is less than a preset value; and when incomplete human face information exists in the edge area of the preview picture, display, in the preview picture, the prompt for entering the panoramic photo shooting mode.

In a possible design method, the processor is further configured to: display, on the display, another preview picture obtained by the camera, where the another preview picture is a preview frame adjacent to the preview picture; and when human face information in the another preview picture increases in comparison with the human face information in the preview picture, display, in the another preview picture displayed on the display, the prompt for entering the panoramic photo shooting mode.

In a possible design method, the processor is further configured to: extract human eye information in the edge area of the preview picture; and if human eye information is extracted, determine that incomplete human face information exists in the edge area of the preview picture; or if no human eye information is extracted, determine that no incomplete human face information exists in the edge area of the preview picture.

In a possible design method, the processor is further configured to: perform mirror symmetry on the edge area to obtain a mirror area after mirror symmetry, where an image in the mirror area is a mirror image of an image in the edge area; detect whether complete human face information exists in the edge area and the mirror area; and if complete human face information exists, determine that incomplete human face information exists in the edge area of the preview picture; or if no complete human face information exists, determine that no incomplete human face information exists in the edge area of the preview picture.

In a possible design method, the processor is further configured to: compare the preview picture with the another preview picture, to determine whether human face information in the another preview picture increases.

In a possible design method, the processor is specifically configured to: when a quantity of human faces in the another preview picture is greater than a quantity of human faces in the preview picture, determine that the human face information in the another preview picture increases; otherwise, determine that the human face information in the another preview picture does not increase; alternatively, when a quantity of human eyes in the another preview picture is greater than a quantity of human eyes in the preview picture, determine that the human face information in the another preview picture increases; otherwise, determine that the human face information in the another preview picture does not increase.

In a possible design method, the processor is further configured to: when the quantity of human faces in the preview picture is greater than a first threshold, display, in the preview picture displayed on the display, a prompt for entering a panoramic photo shooting mode; or when the quantity of human faces in the preview picture is greater than a second threshold, cancel the prompt for entering the panoramic photo shooting mode, where the second threshold is greater than the first threshold.

In a possible design method, the display is further configured to display, in the preview picture, a shortcut for entering the panoramic photo shooting mode.

According to a fourth aspect, an embodiment of this application provides a terminal, including a processor, a memory, a bus, and a communications interface, where the memory is configured to store a computer executable instruction, and the processor is connected to the memory by using the bus. When the terminal runs, the processor executes the computer executable instruction stored in the memory, so that the terminal performs the panoramic photo shooting method according to any one of the foregoing possible design methods.

According to a fifth aspect, an embodiment of this application provides a computer-readable storage medium, where the computer-readable storage medium stores an instruction. When the instruction is run on the terminal according to any one of the foregoing possible design methods, the terminal is enabled to perform the panoramic photo shooting method according to any one of the foregoing possible design methods.

According to a sixth aspect, an embodiment of this application provides a computer program product including an instruction. When the computer program product is run on the terminal according to any one of the foregoing possible design methods, the terminal is enabled to perform the panoramic photo shooting method according to any one of the foregoing possible design methods.

According to a seventh aspect, an embodiment of this application provides a graphical user interface on a terminal, where the terminal includes a display, a memory, a plurality of applications, and one or more processors configured to execute one or more programs stored in the memory; and the graphical user interface includes a user interface displayed in the panoramic photo shooting method according to any one of the foregoing possible design methods.

In the embodiments of this application, a name of the terminal imposes no limitation on the device. In actual implementation, these devices may have other names, provided that functions of the devices are similar to those in the embodiments of this application, that is, fall within the scope of the claims of this application and their equivalent technologies.

In addition, for technical effects brought by any design manner in the second to the seventh aspects, refer to technical effects brought by different design methods in the first aspect. Details are not described herein again.

DESCRIPTION OF EMBODIMENTS

The terms "first" and "second" mentioned in the following are merely intended for description purpose, and shall not be understood as an indication or implication of relative importance or implicit indication of a quantity of indicated technical features. Therefore, a feature limited by "first" or "second" may explicitly or implicitly include one or more features. In a description of the embodiments of this application, unless otherwise stated, "multiple" means two or more than two.

An embodiment of this application provides a panoramic photo shooting method, which may be applied to any terminal that has a shooting function, such as a mobile phone, a terminal, an augmented reality (AR)\virtual reality (VR) device, a tablet computer, a laptop computer, an ultra-mobile personal computer (UMPC), a netbook, and a personal digital assistant (PDA). Certainly, a specific form of the terminal is not limited in the following embodiments.

Figure 1:
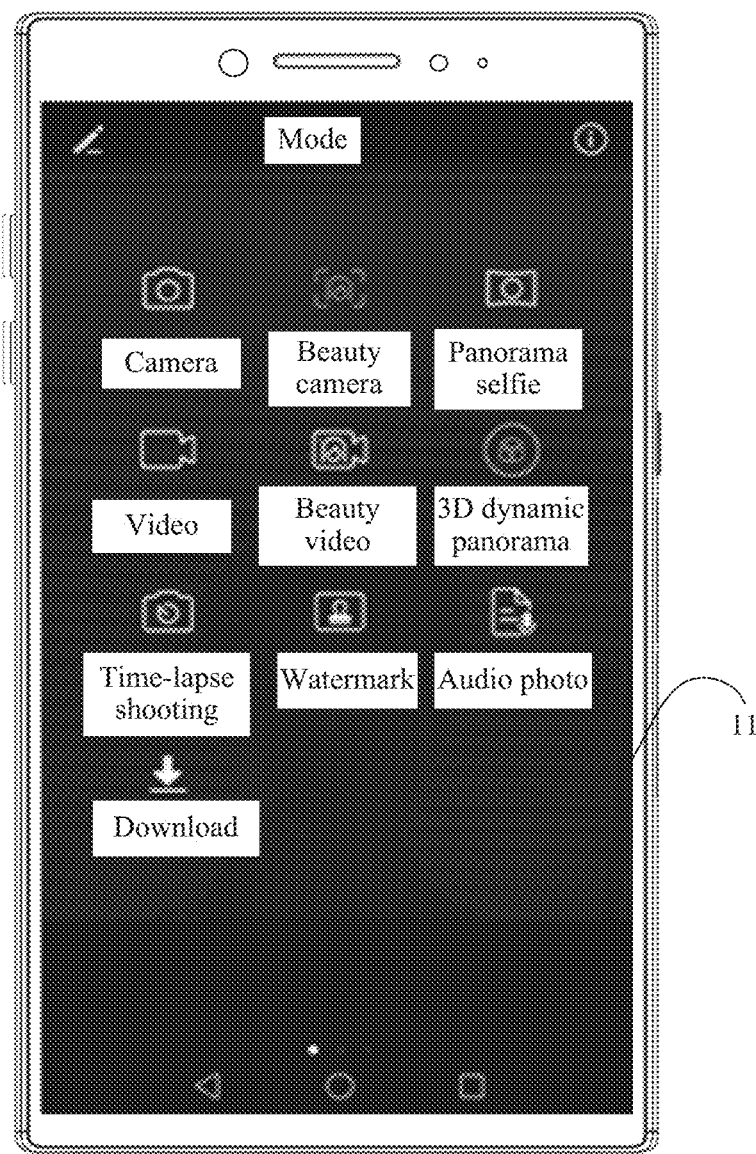
FIG. 1 is a schematic diagram of a UI for selecting a shooting mode in the prior art.
Figure 2:
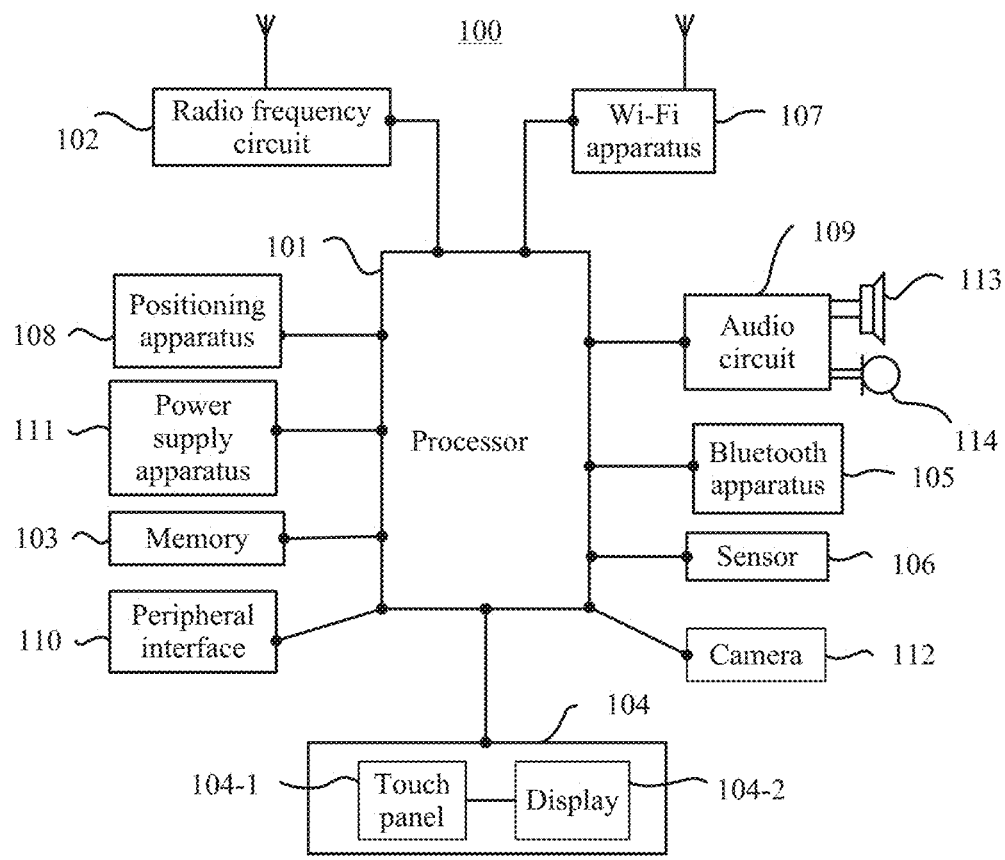
FIG. 2 is a schematic structural diagram 1 of a terminal according to an embodiment of this application.

As shown in FIG. 2, the terminal in an embodiment of this application may be a mobile phone 100. In the following, the mobile phone 100 is used as an example to describe the embodiment in detail. It should be understood that the mobile phone 100 shown in the figure is merely an example of the terminal, and the mobile phone 100 may have more or fewer components than those shown in the figure, may combine two or more components, or may have different component configurations.

As shown in FIG. 2, the mobile phone 100 may specifically include components such as a processor 101, a radio frequency (RF) circuit 102, a memory 103, a touchscreen 104, a Bluetooth apparatus 105, one or more sensors 106, a Wi-Fi apparatus 107, a positioning apparatus 108, an audio circuit 109, a peripheral interface 110, and a power supply system 111. These components may perform communication by using one or more communications buses or signal cables (not shown in FIG. 2). A person skilled in the art may understand that a hardware structure shown in FIG. 2 does not constitute a limitation on the mobile phone. The mobile phone 100 may include more or fewer components than those shown in the figure, or may combine some components, or may have different component arrangements.

The following describes the components of the mobile phone 100 in detail with reference to FIG. 2.

The processor 101 is a control center of the mobile phone 100 and is connected to parts of the mobile phone 100 by using various interfaces and lines. The processor 101 runs or executes an application stored in the memory 103, and invokes data stored in the memory 103, to perform various functions of the mobile phone 100 and data processing. In some embodiments, the processor 101 may include one or more processing units. For example, the processor 101 may be a Kirin 960 chip manufactured by Huawei Technologies Co., Ltd or a Qualcomm Snapdragon 820 chip. In some embodiments of this application, the processor 101 may further include a fingerprint verification chip, configured to verify a collected fingerprint.

The radio frequency circuit 102 may be configured to receive and send a radio signal in an information receiving and sending process or in a call process. In particular, after receiving downlink data from a base station, the radio frequency circuit 102 may send the downlink data to the processor 101 for processing. In addition, the radio frequency circuit 102 sends uplink-related data to the base station. Generally, the radio frequency circuit includes but is not limited to an antenna, at least one amplifier, a transceiver, a coupler, a low noise amplifier, a duplexer, and the like. In addition, the radio frequency circuit 102 may further communicate with another device through wireless communication. The wireless communication may use any communications standard or protocol, including but not limited to a global system for mobile communications, a general packet radio service, code division multiple access, wideband code division multiple access, long term evolution, an email, a short message service, and the like.

The memory 103 is configured to store an application and data. The processor 101 runs the application and the data stored in the memory 103, to perform various functions of the mobile phone 100 and data processing. The memory 103 mainly includes a program storage area and a data storage area. The program storage area may store an operating system, and an application required by at least one function (for example, a sound play function or an image play function). The data storage area may store data (for example, audio data or a phone book) created based on use of the mobile phone 100. In addition, the memory 103 may include a high-speed random access memory (RAM), and may further include a nonvolatile memory, such as a magnetic disk storage device, a flash memory device, or another volatile solid state memory device. The memory 103 may store various operating systems such as an iOS® operating system developed by Apple and an Android® operating system developed by Google. The memory 103 may be independent, and is connected to the processor 101 by using the communications bus. Alternatively, the memory 103 may be integrated into the processor 101.

The touchscreen 104 may specifically include a touch panel 104-1 and a display 104-2.

The touch panel 104-1 can collect a touch event performed by a user of the mobile phone 100 on or near the touch panel 104-1 (for example, an operation performed by the user on the touch panel 104-1 or near the touch panel 104-1 by using any proper object such as a finger or a stylus), and send collected touch information to another component (for example, the processor 101). The touch event performed by the user near the touch panel 104-1 may be referred to as floating touch. The floating touch may mean that the user does not need to directly touch the touch panel for selecting, moving, or dragging an object (for example, an icon), and the user only needs to be located near the terminal to perform a desired function. In addition, the touch panel 104-1 may be implemented in a plurality of types such as a resistive type, a capacitive type, an infrared type, and a surface acoustic wave type.

The display (also referred to as a display screen) 104-2 may be configured to display information entered by the user or provided for the user, and various menus of the mobile phone 100. The display 104-2 may be configured in a form of a liquid crystal display, an organic light-emitting diode, or the like. The touch panel 104-1 may cover the display 104-2. When detecting the touch event on or near the touch panel 104-1, the touch panel 104-1 transfers the touch event to the processor 101 to determine a type of the touch event. Then, the processor 101 can provide corresponding visual output on the display 104-2 based on the type of the touch event. Although the touch panel 104-1 and the display screen 104-2 in FIG. 2 are used as two independent components to implement input and output functions of the mobile phone 100, in some embodiments, the touch panel 104-1 and the display screen 104-2 may be integrated to implement the input and output functions of the mobile phone 100. It may be understood that the touchscreen 104 is formed by stacking a plurality of layers of materials. In this embodiment of this application, only the touch panel (layer) and the display screen (layer) are displayed, and other layers are not described in this embodiment of this application. In addition, the touch panel 104-1 may be disposed on the front of the mobile phone 100 in a form of a full panel, and the display screen 104-2 may also be disposed on the front of the mobile phone 100 in a form of a full panel. In this way, a borderless structure can be implemented on the front of the mobile phone.

In this embodiment of this application, the mobile phone 100 may further include a camera 112. The camera 112 may be a front-facing camera or a rear-facing camera. This is not limited in this embodiment of this application.

Figure 3:
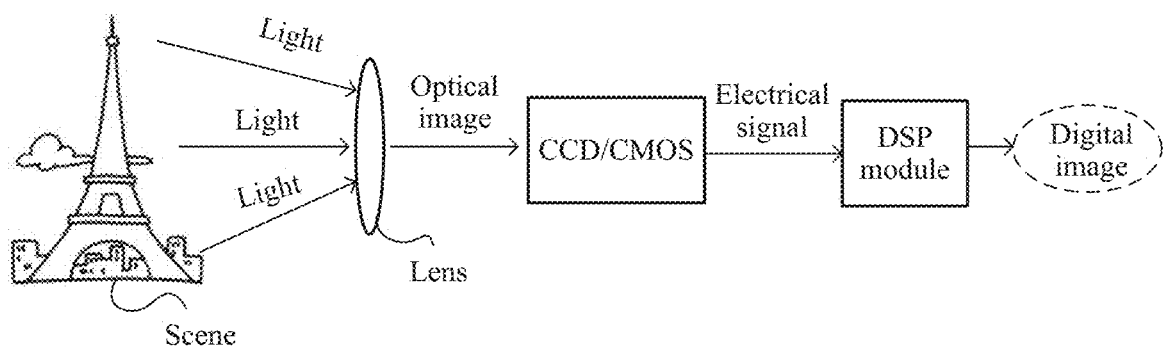
FIG. 3 is a schematic diagram of an operating principle of a camera according to an embodiment of this application.

Specifically, as shown in FIG. 3, the camera 112 generally includes a lens (lens) and an image sensor (sensor). The image sensor may be any photosensitive device such as a CCD (Charge-coupled Device, charge coupled device) or a CMOS (Complementary Metal Oxide Semiconductor, complementary metal-oxide-semi conductor).

In a shooting process, reflected light of a scene passes through the lens and generates an optical image. The optical image is projected on the image sensor, and the image sensor converts a received optical signal into an electrical signal. Then, the camera 112 sends the obtained electrical signal to a DSP (Digital Signal Processing, digital signal processing) module for digital signal processing, finally obtaining a digital image. The digital image may be output on the mobile phone 100 through the display 104-2, or the digital image may be stored in the memory 103.

The DSP module may be integrated into the processor 101 in a form of a functional module, or may be independently disposed in the mobile phone 100 in a form of a chip. This is not limited in this embodiment of this application.

Further, in this embodiment of this application, the mobile phone 100 may further perform panoramic photo shooting by using the camera 112, for example, take a panorama settle by using a front-facing camera. Generally, the panoramic photo shooting means combining a plurality of images shot by the camera 112 into one panoramic image. A basic principle of the panoramic photo shooting is searching for edge parts of two images and overlapping areas with a closest imaging effect to complete automatic combination of the images.

Figure 4:
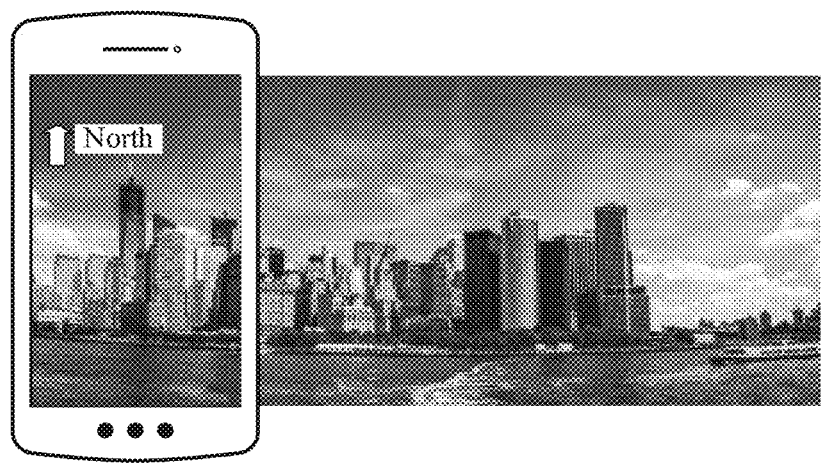
FIG. 4 is a schematic diagram 1 of a principle of panoramic photo shooting according to an embodiment of this application.
Figure 4:
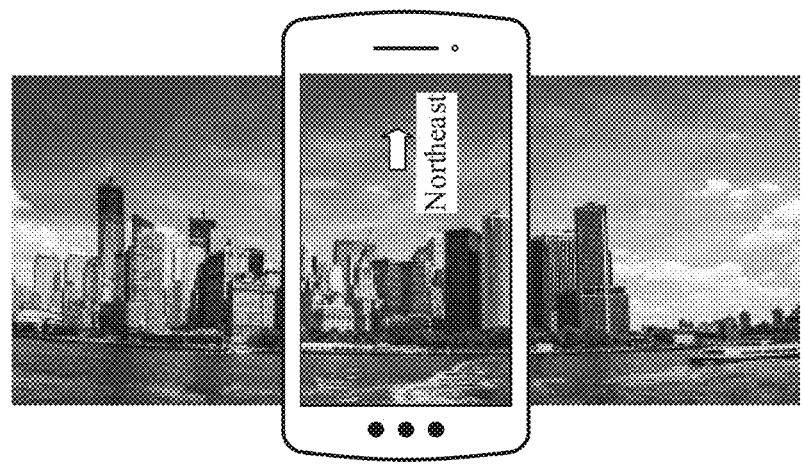
Figure 4:
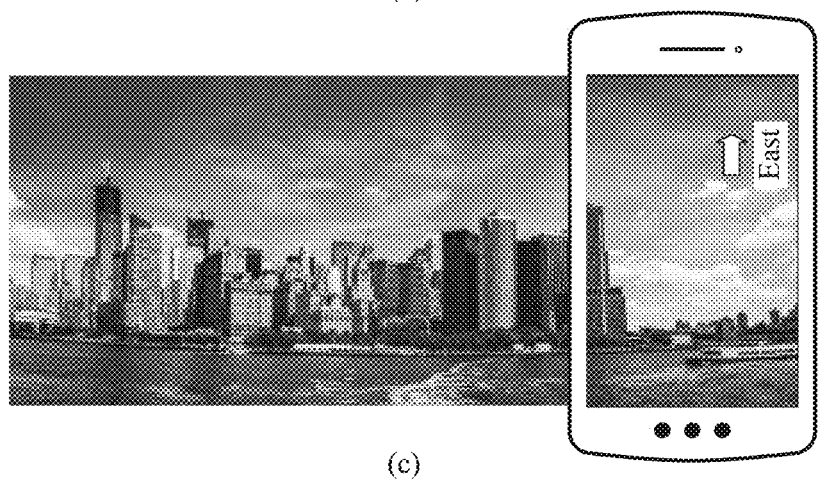
Figure 5:
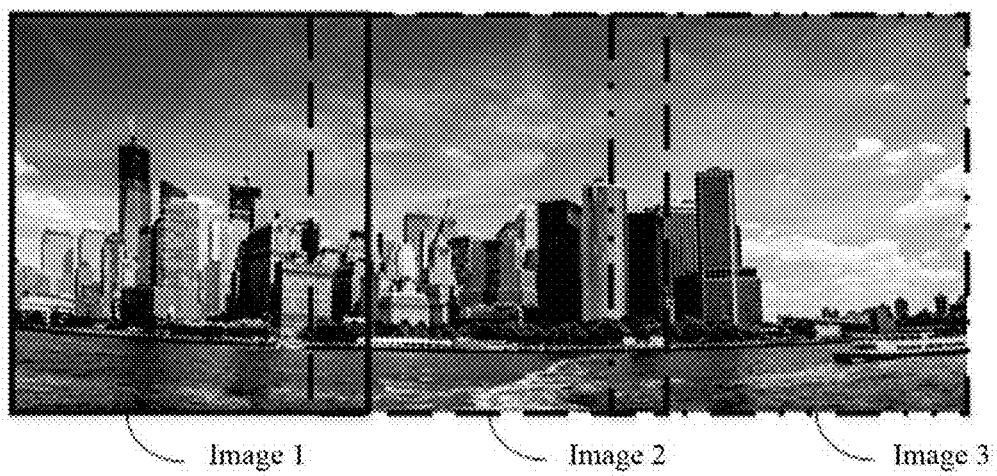
FIG. 5 is a schematic diagram 2 of a principle of panoramic photo shooting according to an embodiment of this application.
Figure 6:
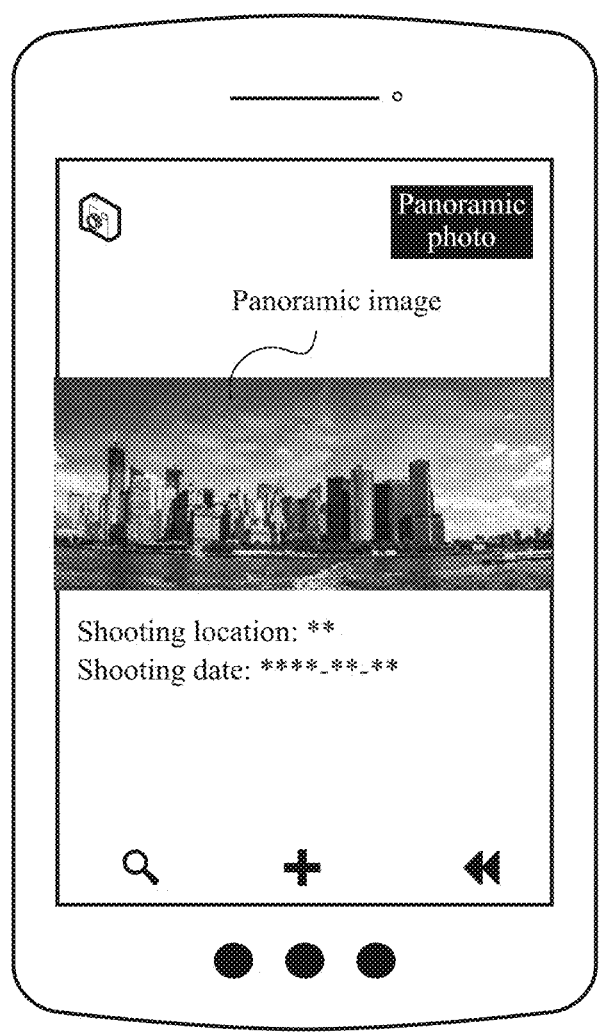
FIG. 6 is a schematic diagram 3 of a principle of panoramic photo shooting according to an embodiment of this application.

For example, as shown in FIG. 4, after the panoramic photo shooting mode is enabled, the user rotates the mobile phone 100 from the north to the east to perform panoramic photo shooting. In this case, an image 1 is obtained through shooting at a position in the north direction, an image 2 is obtained through shooting at a position in the northeast direction, and an image 3 is obtained through shooting at a position in the east direction. Then, as shown in FIG. 5, the mobile phone 100 may perform image fusion, based on a shooting sequence, on overlapping edges of the shot image 1 to image 3, to combine the three images into one panoramic image shown in FIG. 6. This panoramic photo shooting process is completed.

Similarly, when the user takes a selfie by using the front-facing camera, the user may take a panorama selfie by using the foregoing panoramic image shooting method. This is not limited in this embodiment of this application.

The mobile phone 100 may further include the Bluetooth apparatus 105, configured to exchange data between the mobile phone 100 and another short-range terminal (for example, a mobile phone or a smartwatch). The Bluetooth apparatus in this embodiment of this application may be an integrated circuit, a Bluetooth chip, or the like.

The mobile phone 100 may further include at least one type of sensor 106, such as a fingerprint collection device, a light sensor, a motion sensor, and another sensor. Specifically, the light sensor may include an ambient light sensor and a proximity sensor. The ambient light sensor may adjust, based on brightness of ambient light, luminance of the display of the touchscreen 104. The proximity sensor may power off the display when the mobile phone 100 moves to an ear. As a type of motion sensor, an accelerometer sensor may detect an acceleration value in each direction (generally three axes), may detect a value and a direction of gravity when the mobile phone 100 is stationary, and may be configured to recognize a mobile phone posture application (for example, switching between landscape and portrait screens, a related game, and magnetometer posture calibration), a vibration recognition related function (for example, a pedometer or a knock), and the like. Other sensors such as a gyroscope, a barometer, a hygrometer, a thermometer, and an infrared sensor that may be further disposed in the mobile phone 100 are not described herein.

The Wi-Fi apparatus 107 is configured to provide, for the mobile phone 100, network access that complies with a Wi-Fi-related standard or protocol. The mobile phone 100 may access a Wi-Fi access point by using the Wi-Fi apparatus 107, to help the user receive and send an email, browse a web page, access streaming media, and the like. The Wi-Fi apparatus 107 provides wireless broadband Internet access for the user. In some other embodiments, the Wi-Fi apparatus 107 may also be used as a Wi-Fi wireless access point, and may provide Wi-Fi network access for another terminal.

The positioning apparatus 108 is configured to provide a geographical location for the mobile phone 100. It may be understood that the positioning apparatus 108 may be specifically a receiver of a positioning system such as the Global Positioning System (GPS), the BeiDou Navigation Satellite System, and the Russian GLONASS. After receiving a geographical location sent by the foregoing positioning system, the positioning apparatus 108 sends the information to the processor 101 for processing, or sends the information to the memory 103 for storage. In some other embodiments, the positioning apparatus 108 may further be a receiver of an assisted global positioning system (AGPS). The AGPS system serves as an assisted server to assist the positioning apparatus 108 in completing ranging and positioning services. In this case, the assisted positioning server communicates with the positioning apparatus 108 (namely, a GPS receiver) of the terminal such as the mobile phone 100 through a wireless communications network, and provides positioning assistance. In some other embodiments, the positioning apparatus 108 may also be a positioning technology based on a Wi-Fi access point. Each Wi-Fi access point has one globally unique MAC address, and the terminal can scan and collect a broadcast signal of a surrounding Wi-Fi access point when Wi-Fi is enabled. Therefore, the terminal can obtain a MAC address that is broadcast by the Wi-Fi access point. The terminal sends such data (for example, the MAC address) that can identify the Wi-Fi access point to a location server through the wireless communications network. The location server retrieves a geographical location of each Wi-Fi access point, calculates a geographical location of the terminal with reference to strength of the Wi-Fi broadcast signal, and sends the geographical location of the terminal to the positioning apparatus 108 of the terminal.

The audio circuit 109, a loudspeaker 113, and a microphone 114 may provide an audio interface between the user and the mobile phone 100. The audio circuit 109 may convert a received audio data into an electrical signal and transmit the electrical signal to the loudspeaker 113. The loudspeaker 113 converts the electrical signal into a sound signal and outputs the sound signal. On the other hand, the microphone 114 converts the collected sound signal into an electrical signal. The audio circuit 109 receives the electrical signal and converts the electrical signal into audio data, and then outputs the audio data to the RF circuit 102, so as to send the audio data to, for example, another mobile phone. Alternatively, the audio data is output to the memory 103 for further processing.

The peripheral interface 110 is configured to provide various interfaces for an external input/output device (for example, a keyboard, a mouse, a display externally connected to the mobile phone 100, an external memory, and a subscriber identity module card). For example, the mobile phone 100 is connected to the mouse by using a universal serial bus (USB) interface, and is connected, by using a metal contact on a card slot of the subscriber identity module card, to a subscriber identity module (SIM) card provided by a telecommunications operator. The peripheral interface 110 may be configured to couple the foregoing external input/output peripheral device to the processor 101 and the memory 103, The mobile phone 100 may further include a power supply apparatus 111 (for example, a battery and a power management chip) that supplies power to the components. The battery may be logically connected to the processor 101 by using the power management chip, so that functions such as charging management, discharging management, and power consumption management are implemented by using the power supply apparatus 111.

Although not shown in FIG. 2, the mobile phone 100 may further include a camera (a front-facing camera and/or a rear-facing camera), a camera flash, a micro projection apparatus, a near field communication (NFC) apparatus, and the like. Details are not described herein.

Figure 7:
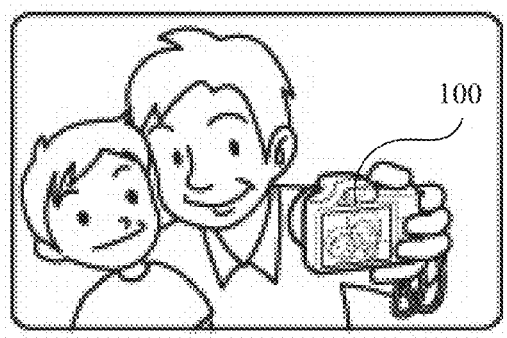
FIG. 7 is a schematic diagram 1 of an application scenario of a panoramic photo shooting method according to an embodiment of this application.

In this embodiment of this application, when a user turns on the camera 112 of the mobile phone 100 to take a photo, particularly when the user enters a selfie mode by using a front-facing camera, as shown in FIG. 7, because a longest shooting distance between the mobile phone 100 and the user is only a length of one arm of the user, or a length of one selfie stick plus the length of one arm, when a quantity of users taking a selfie is relatively large, all faces of the users are difficult to enter a preview box of the mobile phone 100 during shooting, resulting in a poor shooting effect.

Figure 8:
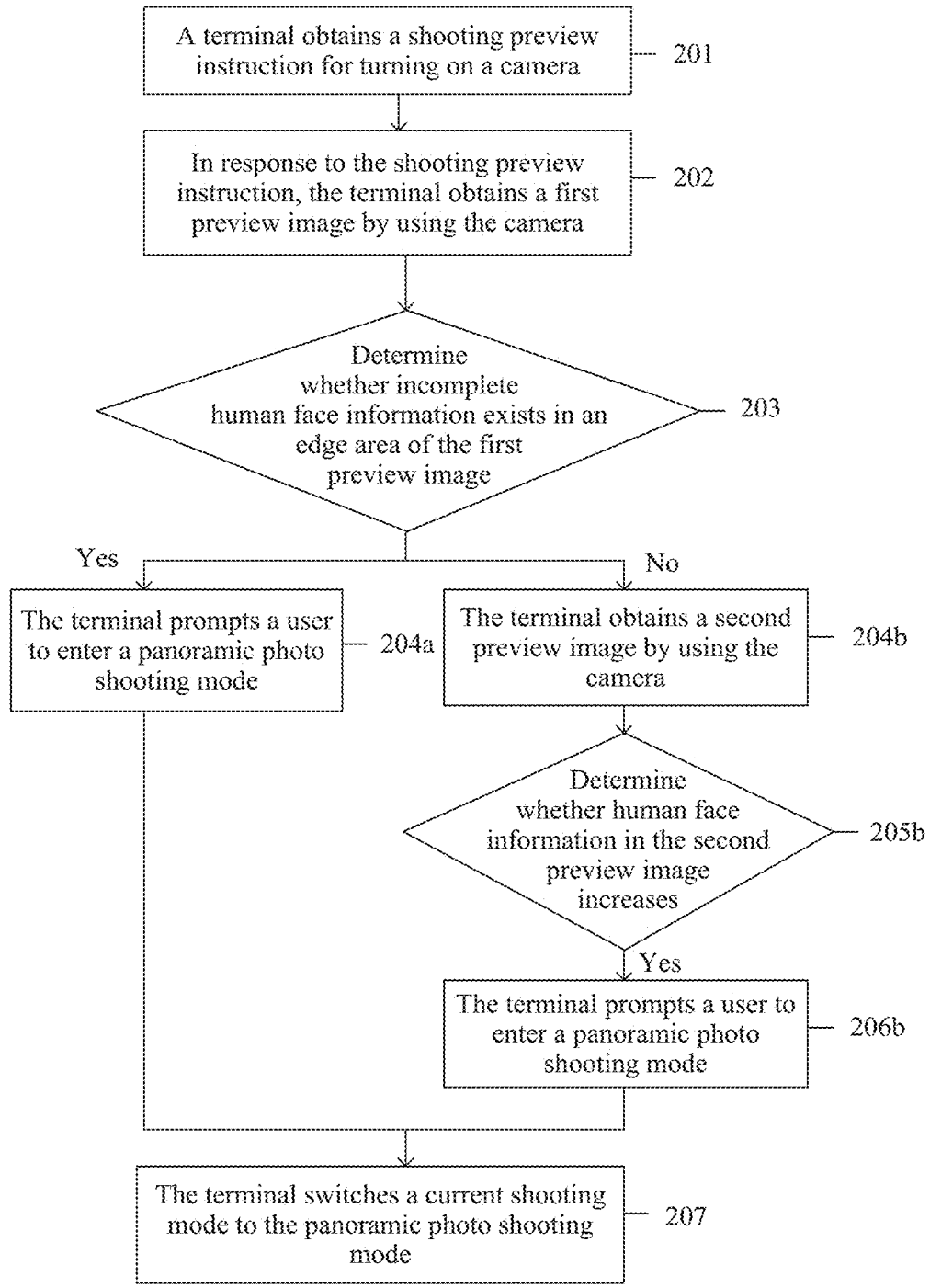
FIG. 8 is a schematic flowchart of a panoramic photo shooting method according to an embodiment of this application.

With respect to this, an embodiment of this application provides a panoramic photo shooting method, as shown in FIG. 8, including the following steps.

201. A terminal obtains a shooting preview instruction for turning on a camera.

Generally, a shooting APP (Application, application) used for shooting is installed in the terminal. In this case, when detecting that a user performs an input operation of turning on the camera, for example, taps an icon of the shooting APP, the terminal may generate the shooting preview instruction. The shooting preview instruction is used to instruct the terminal to turn on the camera to obtain a preview picture currently captured by the camera.

Alternatively, the shooting preview instruction may be sent by another device to the terminal. For example, the user may remotely control, at an office, a camera at home, for example, send a shooting preview instruction by using an APP to turn on the camera installed at home.

Certainly, the shooting preview instruction may be used to instruct to turn on a front-facing camera of the terminal, or may be used to instruct to turn on a rear-facing camera of the terminal. This is not limited in this embodiment of this application.

202. In response to the shooting preview instruction, the terminal obtains a first preview picture by using the camera.

Specifically, after obtaining the shooting preview instruction, the terminal may be triggered to turn on the camera of the terminal. In this case, the turned-on camera can capture a scene currently entering the camera, and display the scene in a preview box on a display screen of the terminal in real time in a form of a preview picture.

Figure 9:
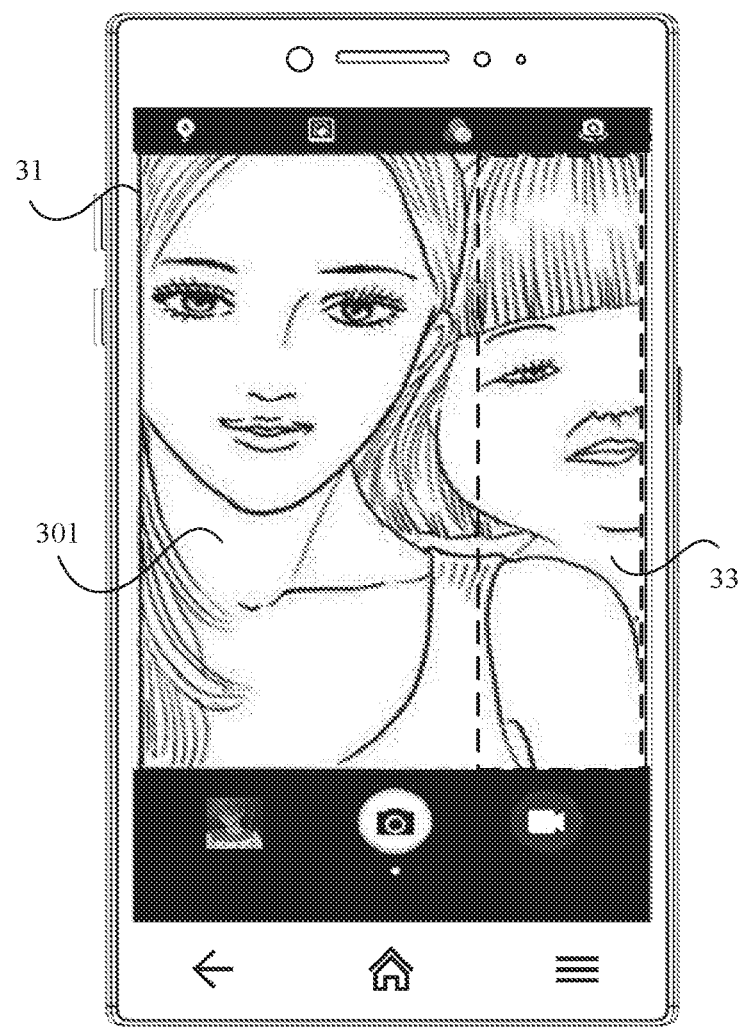
FIG. 9 is a schematic diagram 2 of an application scenario of a panoramic photo shooting method according to an embodiment of this application.

For example, as shown in FIG. 9, the terminal generates a shooting preview instruction in response to an operation of the user for tapping a shooting button. The shooting preview instruction is used to instruct to turn on a front-facing camera. In this case, the terminal enters a selfie mode. After the front-facing camera is turned on, the terminal may obtain a first preview picture 301 by using the front-facing camera to capture a scene currently entering the front-facing camera. The terminal may display the obtained first preview picture 301 in a preview box 31, so that the user adjusts a shooting parameter (for example, an angle of shooting and brightness).

The preview picture may be displayed in a form of a preview frame. Based on an effect of persistence of vision of human eyes, when the terminal updates, at a frame rate of 15 to 30 preview frames per second, a picture captured by the camera, the user may see a real-time changing preview picture in the preview box 31.

203. The terminal determines whether incomplete human face information exists in an edge area of the first preview picture.

The edge area may be preset by the terminal, or may be extracted by the terminal, after obtaining the first preview picture, from the first preview picture.

Figure 10:
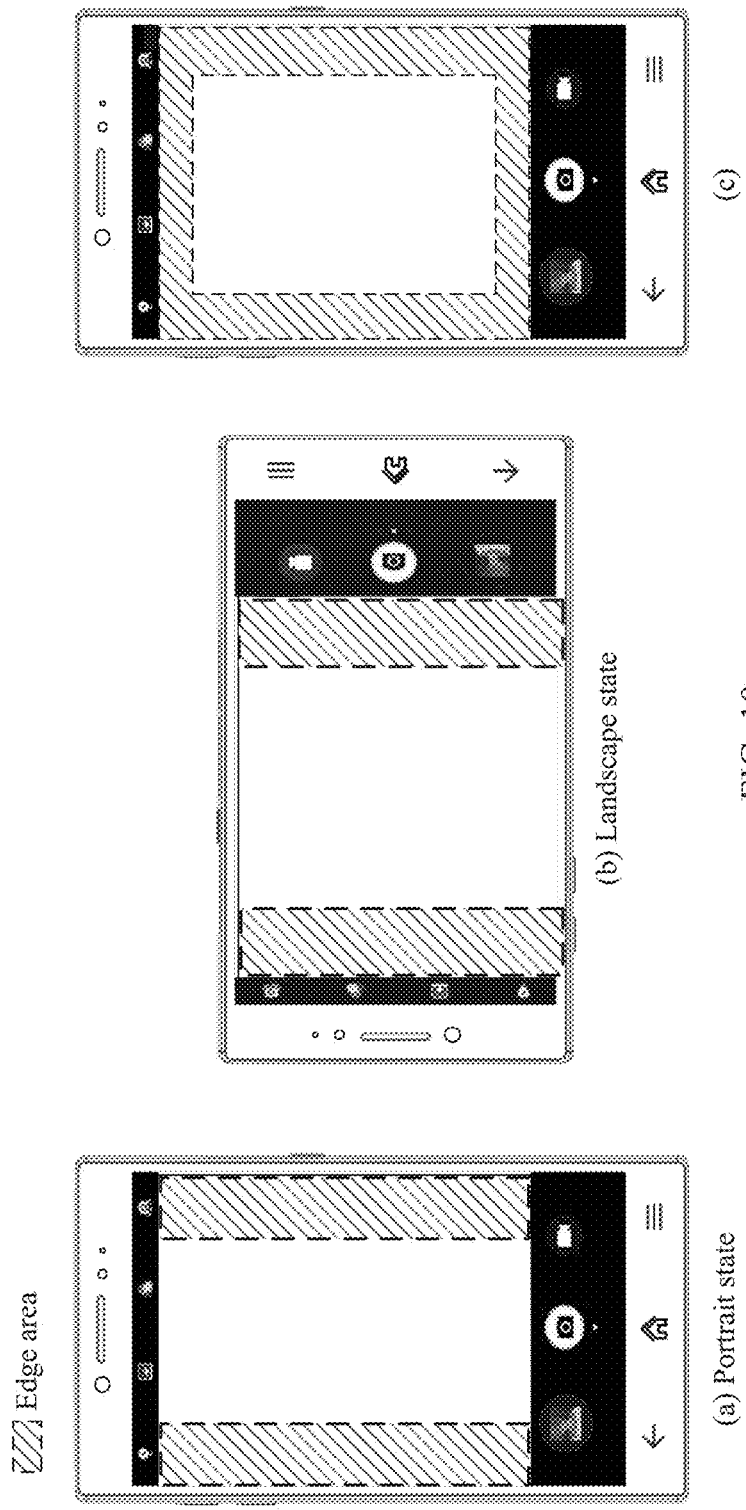
FIG. 10 is a schematic diagram 3 of an application scenario of a panoramic photo shooting method according to an embodiment of this application.

For example, when the terminal is in a portrait state, as shown in (a) in FIG. 10, an area in the preview box close to the long side of the terminal with a preset distance (for example, 1.5 centimeters) may be set as an edge area. When the terminal is in a landscape state, as shown in (b) in FIG. 10, an area in the preview box close to the short side of the terminal with a preset distance (for example, 2 centimeters) may be set as an edge area. Alternatively, as shown in (c) in FIG. 10, an area around the preview box may be set as an edge area. This is not limited in this embodiment of this application.

In step 203, the terminal may perform facial recognition on the edge area of the first preview picture by using a preset facial recognition algorithm, to determine whether incomplete human face information exists in the edge area. For example, facial feature information in the edge area may be extracted by using the Adaboost algorithm, for example, human eye information in the edge area is extracted. Then it may be determined, based on the extracted facial feature information, whether a human face exists in the edge area and whether the human face is complete.

For example, still as shown in FIG. 9, if the terminal detects that the human face information in the edge area 33 of the first preview picture 301 includes two human eyes, it may be determined that the human face information in the edge area 33 is complete. If the terminal detects that the human face information in the edge area 33 of the first preview picture 301 includes only one human eye, it may be determined that incomplete human face information exists in the edge area 33.

Alternatively, the terminal may further determine, by performing mirror symmetry on the edge area 33, whether incomplete human face information exists in the edge area 33.

Figure 11:
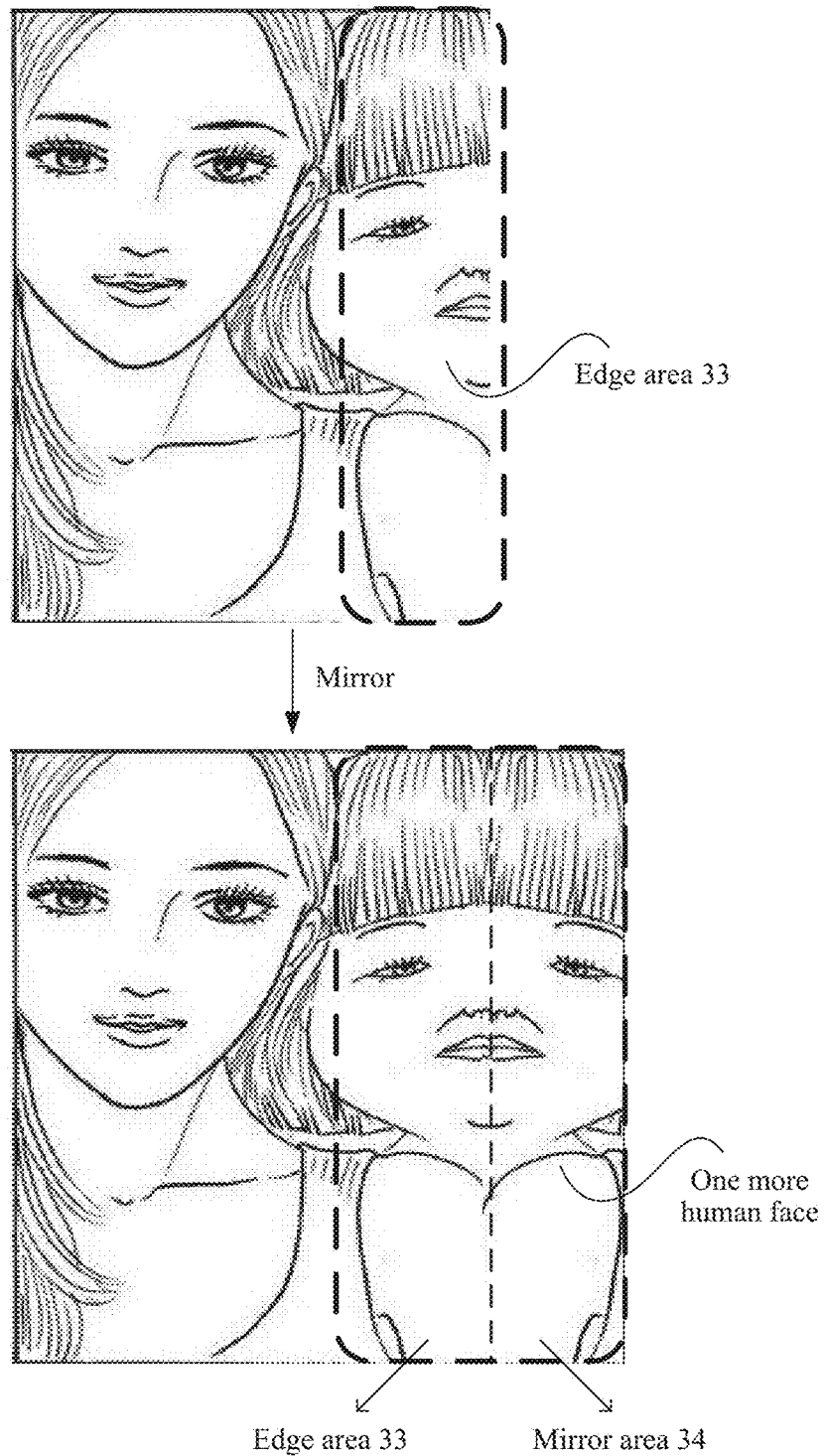
FIG. 11 is a schematic diagram 4 of an application scenario of a panoramic photo shooting method according to an embodiment of this application.

For example, as shown in FIG. 11, after obtaining the first preview picture 301, the terminal may perform mirror symmetry processing on the image in the edge area 33 of the first preview picture 301, to obtain a first preview picture 301 after minor symmetry. In the first preview picture 301 after mirror symmetry, the edge area 33 is extended to a mirror area 34 after mirror symmetry. In this case, the terminal may perform facial recognition in a complete area that includes the edge area 33 and the mirror area 34. If a complete human face can be recognized, it may be determined that incomplete human face information exists in the edge area 33 of the first preview picture 301.

When a shooting picture is relatively complex, an error may occur when the terminal recognizes an incomplete human face. For example, the terminal recognizes a part of a face of an animal as a human face, or recognizes an approximately circular object as a human eye. However, after mirror symmetry is performed on the edge area 33, only complete human faces in the edge area 33 and the mirror area 34 need to be recognized, and accuracy of recognizing a complete human face by the terminal is relatively high. Therefore, according to the foregoing method for determining, through mirror symmetry, whether incomplete human face information exists in the edge area 33, accuracy of recognizing an incomplete human face in the edge area can be improved.

In addition, the image-symmetric facial recognition function may always run after the user turns on the camera, or may be enabled and rim after the terminal extracts a part of human face information in the edge area 33 of the first preview picture 301. Alternatively, enabling or disabling of the image-symmetric recognition function may be manually set by the user. This is not limited in this embodiment of this application.

Certainly, the terminal may also perform facial recognition on all areas of the first preview picture 301. This is not limited in this embodiment of this application.

Then, when incomplete human face information exists in the edge area of the first preview picture, the terminal may continue to perform a subordinate step 204*a*. When no incomplete human face information exists in the edge area of the first preview picture, the terminal may continue to perform subordinate steps 204*b* to 206*b*.

204*a*. When incomplete human face information exists in the edge area of the first preview picture, the terminal prompts the user to enter a panoramic photo shooting mode.

Figure 12:
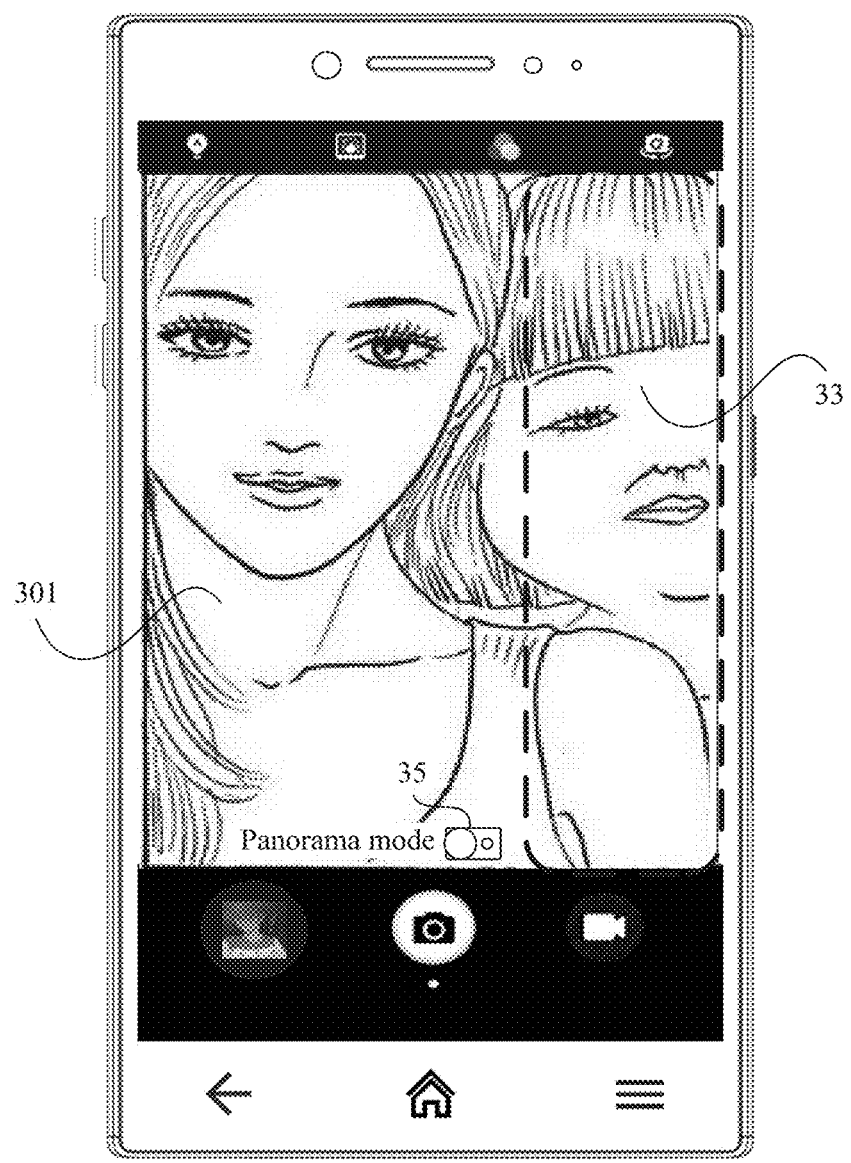
FIG. 12 is a schematic diagram 5 of an application scenario of a panoramic photo shooting method according to an embodiment of this application.

In step 204*a*, as shown in FIG. 12, when incomplete human face information exists in the edge area 33 of the first preview picture 301, it indicates that, in this case, a wider angle of shooting is required to display faces of one or more shot users in a preview box. Therefore, as shown in FIG. 12, the terminal may display a shortcut button 35 of the panorama mode in the first preview picture 301, so as to prompt the user to enter the panoramic photo shooting mode to obtain a better shooting effect.

Then, if it is detected that the user turns on the shortcut button 35, the terminal may be triggered to switch to the panoramic photo shooting mode, for example, a panorama selfie mode. Therefore, in the panoramic photo shooting mode, the user may completely shoot, into a panoramic image, an incomplete human face that is originally located on an edge of the first preview picture 301.

Certainly, in addition to the shortcut button 35, the terminal may prompt, by using one or more prompt approaches such as a text, an animation, a voice, or vibration, the user to enter the panoramic photo shooting mode. This is not limited in this embodiment of this application.

204*b*. When no incomplete human face information exists in the edge area of the first preview picture, the terminal obtains a second preview picture by using the camera.

Figure 13:
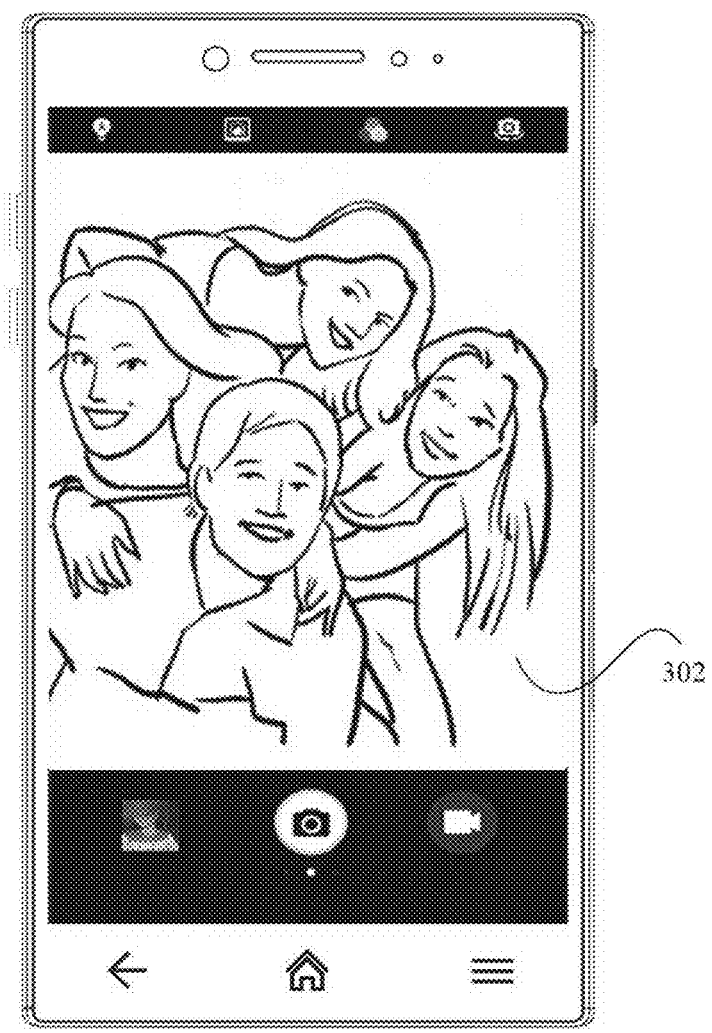
FIG. 13 is a schematic diagram 6 of an application scenario of a panoramic photo shooting method according to an embodiment of this application.

When no incomplete human face information exists in the edge area of the first preview picture, it indicates that, in this case, there is no human face in the edge area of the first preview picture, or a human face in the edge area of the first preview picture is complete. For example, as shown in FIG. 13, the first preview picture obtained by the terminal in step 202 is a first preview picture 302. After facial recognition, the terminal determines that no incomplete human face information exists in an edge area of the first preview picture 302. In other words, there is no human face in the edge area of the first preview picture 302, or the human face in the edge area of the first preview picture 302 is relatively complete.

Figure 14:
FIG. 14 is a schematic diagram 7 of an application scenario of a panoramic photo shooting method according to an embodiment of this application.

In this case, in step 204*b*, as shown in FIG. 14, the terminal may continue to obtain a second preview picture 303 by using the camera of the terminal. The second preview picture 303 and the first preview picture 302 may be two adjacent preview frames.

205*b*. The terminal determines whether the human face information in the second preview picture increases in comparison with human face information in the first preview picture.

After obtaining the second preview picture 303, the terminal may perform facial recognition on the second preview picture 303, and then compare a quantity of human faces in the second preview picture 303 with a quantity of human faces in the first preview picture 302, to determine whether the human face information in the second preview picture 303 increases.

Still as shown in FIG. 14, the quantity of human faces in the second preview picture 303 is five. In comparison with four human faces in the first preview picture 302, one human face is added, that is, the human face information in the second preview picture 303 increases.

Figure 15:
FIG. 15 is a schematic diagram 8 of an application scenario of a panoramic photo shooting method according to an embodiment of this application.

Alternatively, as shown in FIG. 15, after performing facial recognition, the terminal may determine that the human face added to the second preview picture 303 is incomplete. For example, the terminal extracts only information about one newly added human eye. In this case, it may also be considered that human face information in the second preview picture 303 increases.

Figure 16:
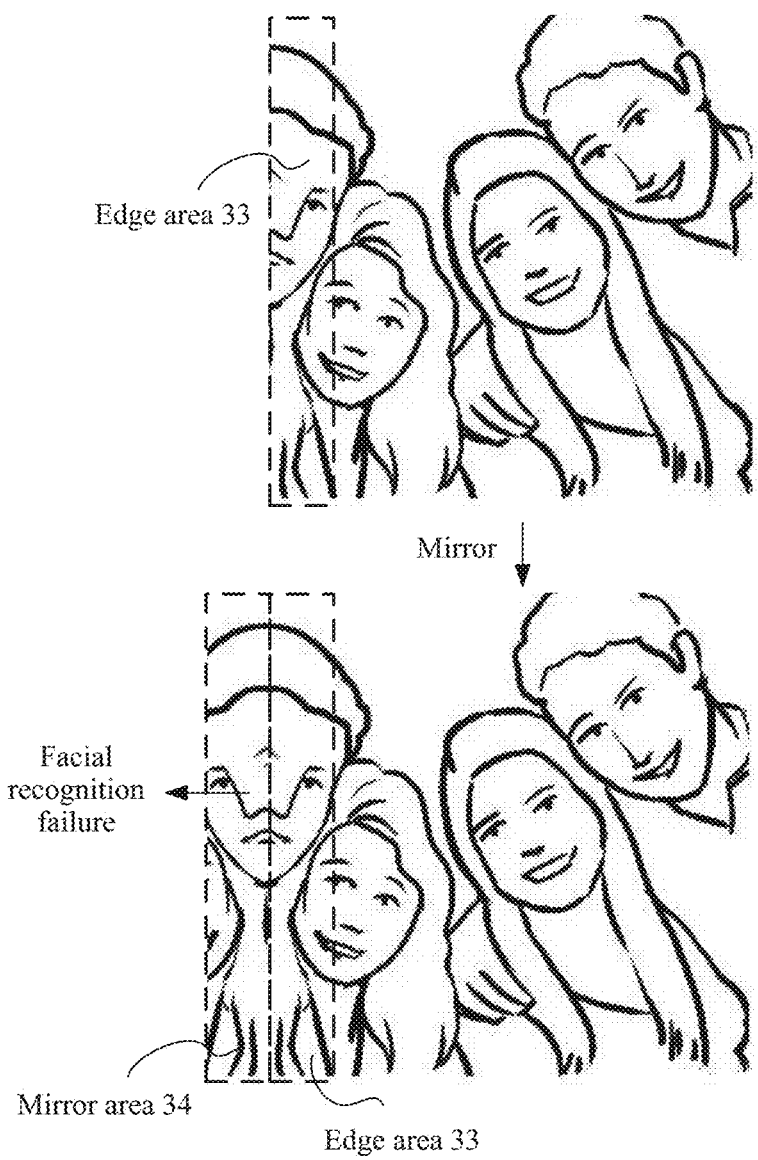
FIG. 16 is a schematic diagram 9 of an application scenario of a panoramic photo shooting method according to an embodiment of this application.

Alternatively, similar to the minor symmetry in step 203, the terminal may further perform mirror symmetry on an edge area 33 of the second preview picture 303 to obtain a second preview picture 303 after mirror symmetry. As shown in FIG. 16, in the second preview picture 303 after mirror symmetry, the edge area 33 is extended to a mirror area 34 after mirror symmetry. In this case, the terminal may perform facial recognition in a complete area that includes the edge area 33 and the mirror area 34. If a complete human face can be recognized, it may be determined that the human face information in the second preview picture 303 increases in comparison with the human face information in the first preview picture 302.

Still as shown in FIG. 16, if facial feature information in the edge area 33 of the second preview picture 303 is less, for example, only one third of a human face, the terminal may fail to recognize a newly added human face in the second preview picture 303 after mirror symmetry. In this case, if a newly added human eye can be recognized, the terminal may also consider that the human face information in the second preview picture 303 increases.

Certainly, if relatively high accuracy of facial recognition is required by the terminal or a shooting APP, to reduce a risk of a facial recognition error, if the terminal fails to recognize a complete human face in the second preview picture obtained after mirror symmetry, it may be considered that the human face information in the second preview picture 303 does not increase.

Optionally, when the terminal performs facial recognition on the second preview picture 303, the facial recognition may be performed only on picture content of the edge area in the preview box. For example, human eye recognition is performed on the picture content of the edge area in the preview box. This is not limited in this embodiment of this application.

206*b*. When the human face information in the second preview picture increases, the terminal prompts the user to enter the panoramic photo shooting mode.

When the human face information in the second preview picture 303 increases, it indicates that, in this case, one or more new users enter the shooting picture. Then, the terminal may prompt the user to enter the panoramic photo shooting mode, so that all faces of a plurality of users are displayed in the preview box by using a wider-angle panoramic photo shooting method, thereby improving a shooting effect.

Still as shown in FIG. 14 or FIG. 15, the terminal may prompt, by using a text prompt 36, the user to turn on a switching button 304 of the panoramic photo shooting mode. Then, if it is detected that the user turns on the switching button 304 through tapping, the terminal may be triggered to switch to the panoramic photo shooting mode, so that the user may shoot, in the panoramic photo shooting mode, a plurality of users comprehensively in a form of a wide angle.

Figure 17:
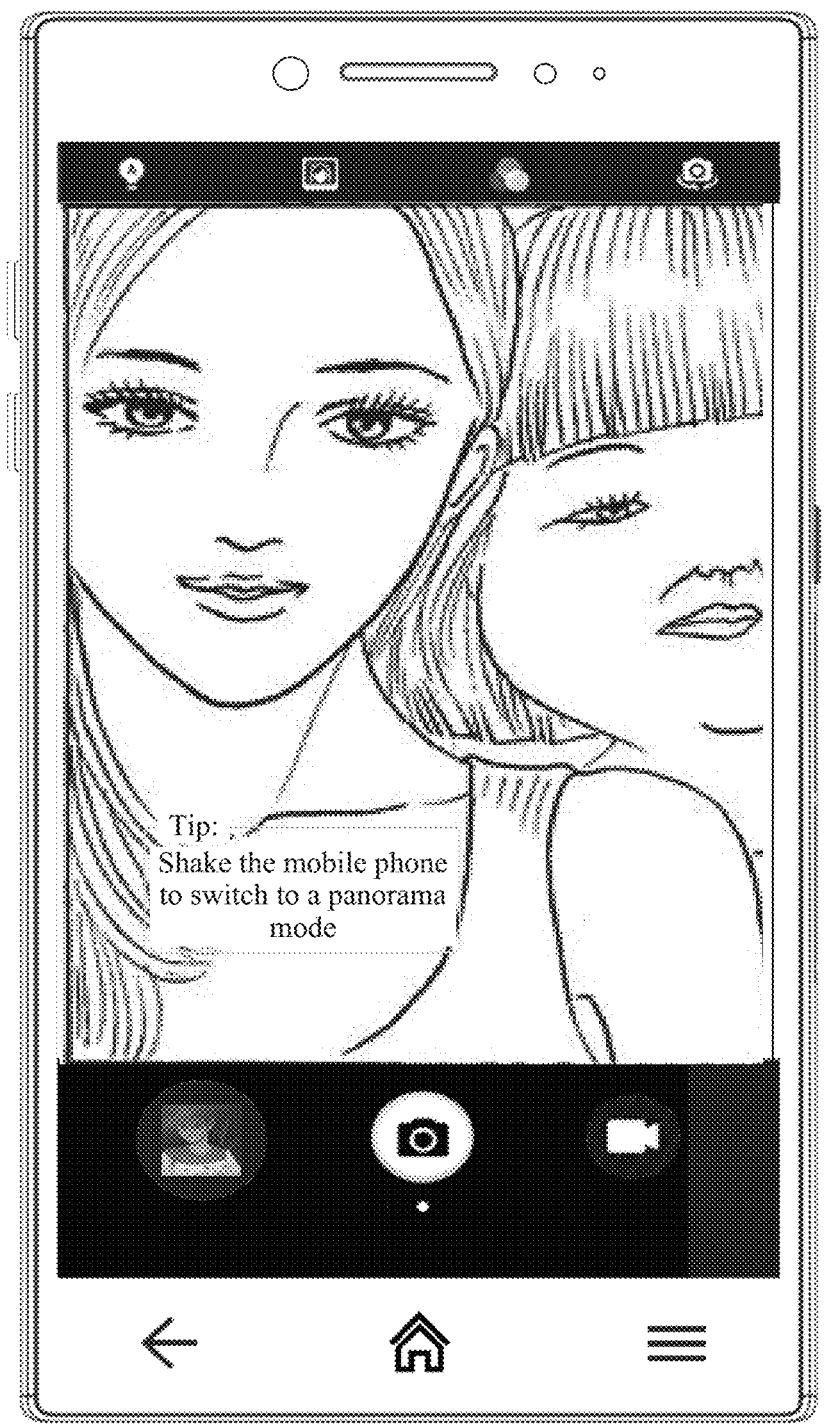
FIG. 17 is a schematic diagram 10 of an application scenario of a panoramic photo shooting method according to an embodiment of this application.

Alternatively, the terminal may further use one or more gestures as shortcuts for switching to the panoramic photo shooting mode. For example, when the camera is turned on, a shake gesture may be used as a shortcut for switching to the panoramic photo shooting mode. As shown in FIG. 17, the terminal may prompt, in a current preview picture, the user to execute the shake gesture. After the user executes the shake gesture, an acceleration sensor in the terminal may sense the gesture of the user, and then trigger the terminal to switch the current shooting mode to the panoramic photo shooting mode.

For another example, when the camera is turned on, a gesture of knocking the terminal may also be used as a shortcut for switching to the panoramic photo shooting mode. In this case, the terminal may prompt, in the current preview picture, the user to execute the knocking gesture. After the user executes the knocking gesture, the acceleration sensor in the terminal may sense the gesture of the user, and then trigger the terminal to switch the current shooting mode to the panoramic photo shooting mode.

In addition, when the terminal turns on the front-facing camera, the user is usually taking a selfie. In this case, to facilitate an operation of the user, the terminal may use a gesture or a button that can be operated by the user with one hand (for example, pressing a volume key) as a shortcut for switching to the panoramic photo shooting mode. This is not limited in this embodiment of this application.

207. The terminal switches the current shooting mode to the panoramic photo shooting mode.

Figure 18A:
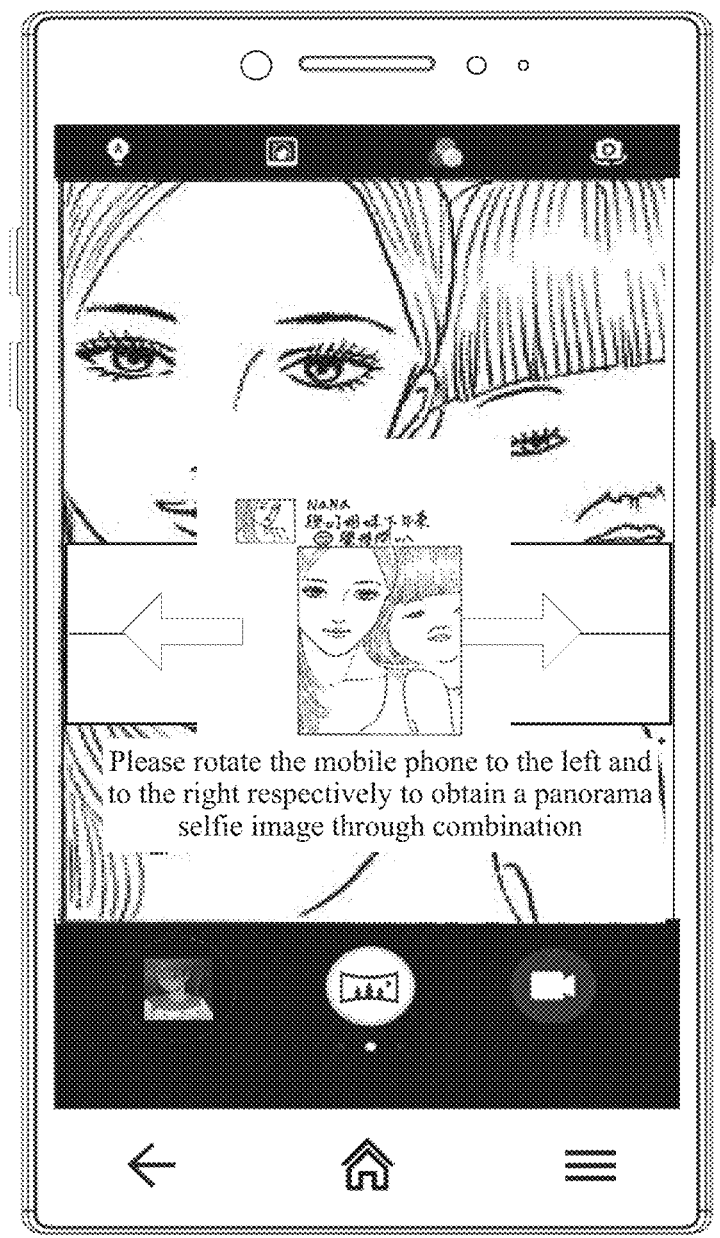
FIG. 18A is a schematic diagram 11 of an application scenario of a panoramic photo shooting method according to an embodiment of this application.

In a possible design method, when the terminal determines, in step 203, that incomplete human face information exists in the edge area of the first preview picture, or when the terminal determines, in step 205*b*, that the human face information in the second preview picture increases, the terminal may be directly triggered to perform step 207. For example, as shown in FIG. 18A, in a selfie mode, when it is detected that incomplete human face information exists in the edge area of a current preview picture, the terminal may switch the current shooting mode (for example, the selfie mode) to the panoramic photo shooting mode (for example, a panorama selfie mode). In this case, the terminal displays a preview picture captured by the front-facing camera in the panorama selfie mode. Still as shown in FIG. 18A, an operation method for the user to take a panorama selfie may be further prompted in the preview picture, for example, the user is prompted to rotate to the left and to the right respectively. In this way, the user does not need to perform an unnecessary operation in a shooting process, and the terminal may automatically switch to the panoramic photo shooting mode based on the human face information in the preview picture.

Figure 18B:
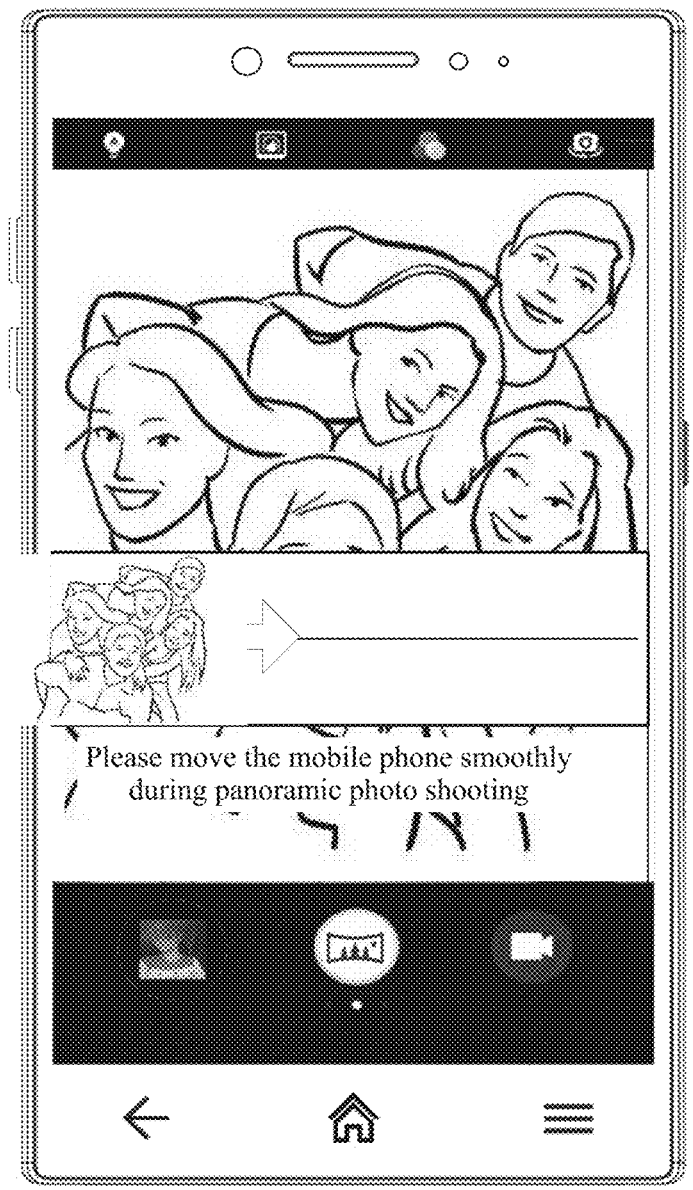
FIG. 18B is a schematic diagram 12 of an application scenario of a panoramic photo shooting method according to an embodiment of this application.

In a possible design method, within a preset time after the terminal prompts the user to enter the panoramic photo shooting mode (to be specific, after step 204*a* and step 206*b*), for example, within three seconds, if an input operation of the user for enabling the panoramic photo shooting mode is received, for example, the user taps a shortcut for entering the panoramic photo shooting mode, the terminal performs step 207 in response to the user operation. For example, as shown in FIG. 18B, when the rear-facing camera is turned on, if an input operation of the user for entering the panoramic photo shooting mode is detected, the terminal may switch the current shooting mode to a rear-facing panoramic photo shooting mode. In this case, the terminal displays a preview picture captured by the rear-facing camera in the rear-facing panoramic photo shooting mode. Still as shown in FIG. 18B, an operation method for the user to take a panorama selfie may be further prompted in the preview picture, for example, the user is prompted to rotate in a direction of an arrow.

In a possible design method, within the preset time after the terminal prompts the user to enter the panoramic photo shooting mode (to be specific, after step 204a and step 206b), if no operation of the user for enabling the panoramic photo shooting mode is received, as shown in FIG. 18, the terminal may be triggered to perform step 207, to be specific, to switch the current shooting mode to the panoramic photo shooting mode. This can avoid a problem that the user does not switch to the panoramic photo shooting mode due to inconvenience of operating the terminal in a shooting process.

Certainly, within the preset time after the terminal prompts the user to enter the panoramic photo shooting mode (to be specific, after step 204a and step 206b), if no operation of the user for enabling the panoramic photo shooting mode is received, a reason may be that the user does not want to enter the panoramic photo shooting mode. In this case, the terminal may cancel the prompt for prompting the user to enter the panoramic photo shooting mode.

Figure 19A:
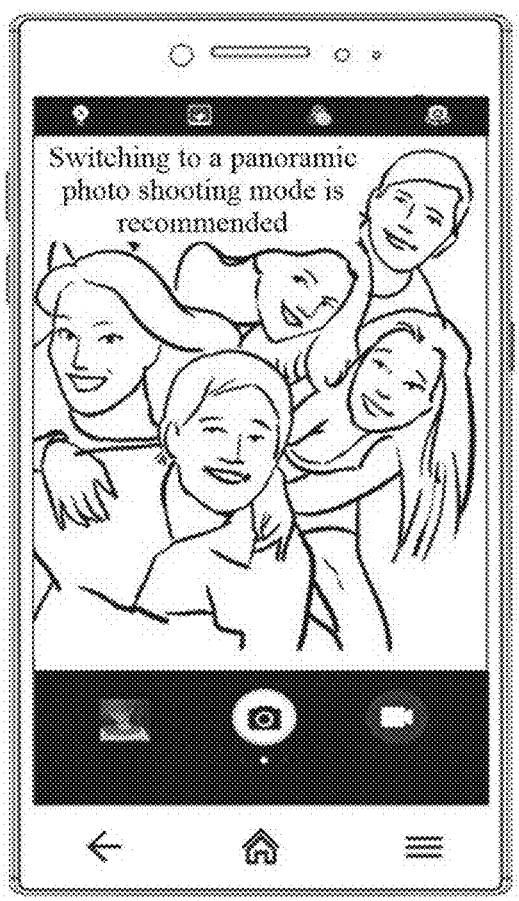
FIG. 19(a) and FIG. 19(b) are a schematic diagram 13 of an application scenario of a panoramic photo shooting method according to an embodiment of this application.

In some embodiments of this application, the terminal may further detect a quantity of human faces in the current preview picture in real time. When the quantity of human faces is greater than a first threshold, the terminal may be triggered to prompt the user to enter the panoramic photo shooting mode, to obtain a better shooting effect. For example, as shown in FIG. 19(a), when the terminal is in the selfie mode, because a shooting distance is limited by an arm length of a user who performs shooting, it is relatively difficult to display a complete face of a user in a preview picture when the selfie is taken. In addition, when the quantity of human faces is relatively large, a layout of the human faces in the preview picture is relatively crowded, and a fish effect on an edge of the picture is relatively obvious. In this case, when it is detected that incomplete human face information exists on the edge of the preview picture, or when the quantity of human faces in the current preview picture is greater than or equal to one, the terminal may prompt the user to enter the panoramic photo shooting mode.

Figure 19B:
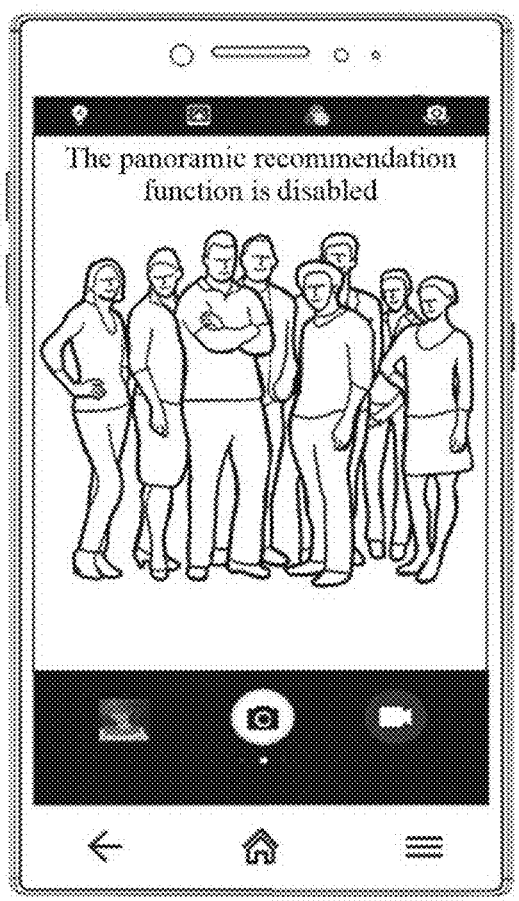

In some other embodiments of this application, if the quantity of human faces in the current preview picture is greater than a second threshold (the second threshold is greater than the first threshold), for example, as shown in FIG. 19(b), the quantity of human faces in the preview picture is eight (which is greater than the second threshold 7). In this case, a relatively large quantity of humans in the preview picture indicates that a shooting distance between the terminal and a shot user is relatively long, and the terminal may shoot a plurality of users at the same time without entering the panoramic photo shooting mode. Therefore, the terminal may disable the foregoing pan-oramic recommendation function for prompting the user to enter the panoramic photo shooting mode.

Certainly, the terminal may further determine, based on a facial feature parameter such as a human face size detected in the preview picture, an intention of the user for being shot. This is not limited in this embodiment of the present invention. For example, when it is detected that a size of a newly added human face in the current preview picture is relatively small, it indicates that a user corresponding to the newly added human face may only pass through a shooting range of the camera, and is accidentally shot by the camera. Therefore, when the size of the newly added human face is relatively small, the terminal may ignore information about the newly added human face, and consider that the human face information in the current preview picture does not change.

Figure 20:
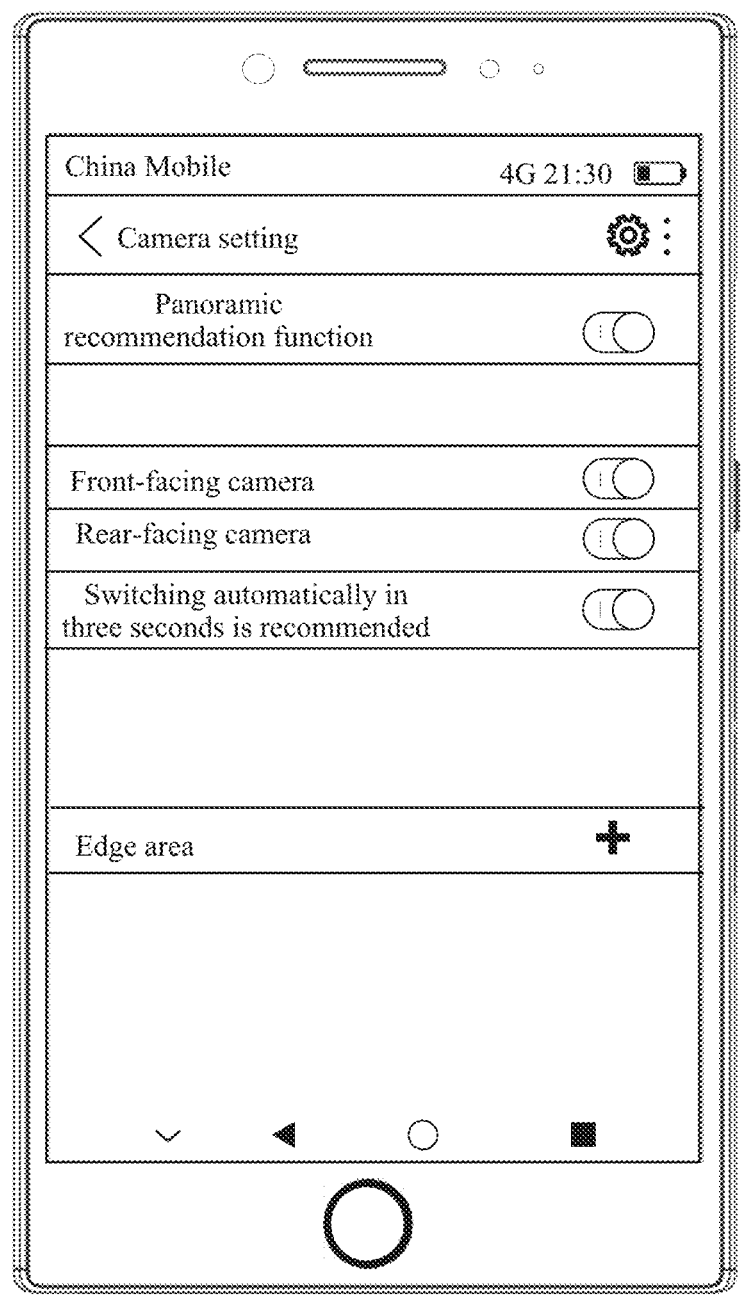
FIG. 20 is a schematic diagram 14 of an application scenario of a panoramic photo shooting method according to an embodiment of this application.

In addition, as shown in FIG. 20, the user may further enter a setting interface of the camera APP to manually enable or disable the foregoing panoramic recommendation function. Optionally, the user may further set, in the setting interface, a panoramic recommendation function for turning on a front-facing camera and/or a panoramic recommendation function for turning on a rear-facing camera. In addition, the user may further set, in the sating interface, a size, a specific location, and the like of an edge area when the edge area is image-symmetric. This is not limited in this embodiment of this application.

It may be understood that, to implement the foregoing functions, the terminal and the like include corresponding hardware structures and/or software modules for performing the functions. A person skilled in the art should easily be aware that, in combination with the examples of the units and algorithm steps described in the embodiments disclosed in this specification, the embodiments of this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, the terminal and the like may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, module division is an example, and is merely a logical function division. In actual implementation, another division manner may be used.

Figure 21:
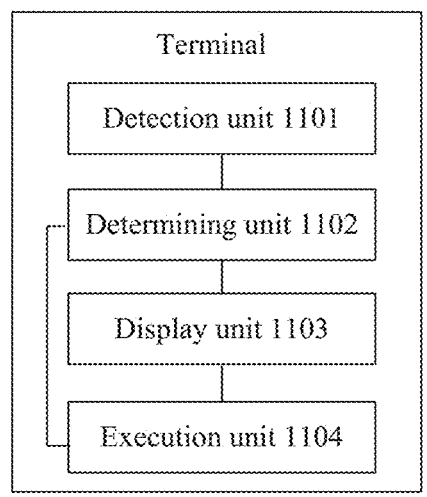
FIG. 21 is a schematic structural diagram 2 of a terminal according to an embodiment of this application.
Figure 22:
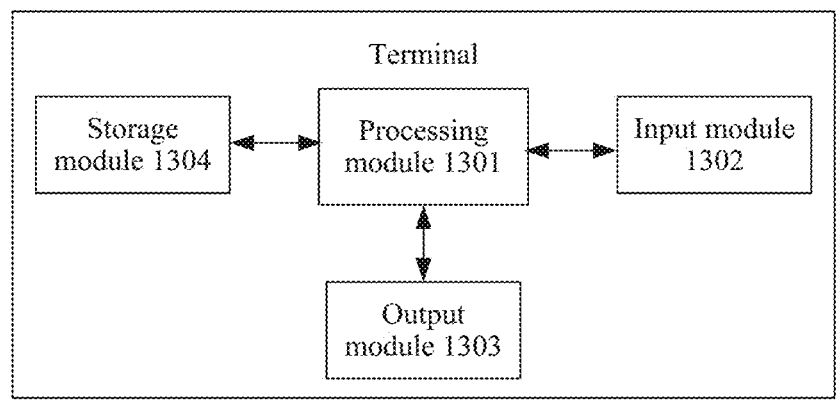
FIG. 22 is a schematic structural diagram 3 of a terminal according to an embodiment of this application.

When each functional module is obtained through division based on each corresponding function, FIG. 21 is a possible schematic structural diagram of a terminal used in the foregoing embodiments. The terminal includes: a detection unit 1101, a determining unit 1102, a display unit 1103, and an execution unit 1104.

The detection unit 1101 is configured to support the terminal in performing processes 201, 202, and 204b in FIG. 8. The determining unit 1102 is configured to support the terminal in performing processes 203 and 205b in FIG. 8. The display unit 1103 is configured to support the terminal in performing processes 204a and 206b in FIG. 8. The execution unit 1105 is configured to support the terminal in performing process 207 in FIG. 8. All content related to the steps in the foregoing method embodiments may be cited in functional description of corresponding functional modules. Details are not described herein again.

When an integrated unit is used. FIG. 21 is a possible schematic structural diagram of the terminal in the foregoing embodiments.

The determining unit 1102 and the execution unit 1105 may be integrated into a processing module 1301. The detection unit 1101 is integrated into an input module 1302. The display unit 1103 is integrated into an output module 1303, In addition, the terminal may further include a storage module 1304.

Specifically, the processing module 1302 is configured to control and manage an action of the terminal. The input module 1302 and the output module 1303 are configured to support communication between the terminal and another network entity. The storage module 1304 is configured to store program code and data of the terminal.

The processing module 1301 may be a processor or a controller, such as a central processing unit (Central Processing Unit, CPU), a general-purpose processor, a digital signal processor (Digital Signal Processing, DSP), an application-specific integrated circuit (Application-Specific Integrated Circuit, ASIC), a field programmable gate array (Field Programmable Gate Array, FPGA), or another programmable logic device, a transistor logic device, a hardware component, or any combination thereof. The processing module 1301 may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

The input module 1302 may be any input device such as a touchscreen, a camera, a microphone, a keyboard, or a mouse.

The output module 1303 may be any output device such as a display, an earpiece, a loudspeaker, or a light-emitting device.

The storage module 1304 may be a memory. The memory may include a high-speed random access memory (RAM), and may further include a nonvolatile memory such as a magnetic disk memory device, a flash memory device, or another volatile solid state memory device.

When the processing module 1301 is a processor, the input module 1302 is a camera, the output module 1303 is a display, and the storage module 1304 is a memory, the terminal provided in the embodiments of this application may be specifically the mobile phone 100 shown in FIG. 2.

In addition, an embodiment of the present invention provides a graphical user interface (GUI) on a terminal. The graphical user interface specifically includes a user interface that is displayed when the terminal performs any one of steps 201 to 207.

Specifically, when the terminal turns on a camera of the terminal, the terminal may display a first GUI on a display of the terminal. The first GUI displays a preview picture obtained by the camera. For example, as shown in FIG. 9, the first GUI may be a preview interface in a selfie mode. Further, when incomplete human face information exists in an edge area of the preview picture, as shown in FIG. 12, the terminal may display a second GUI on the display of the terminal. On the basis of the first GUI, the second GUI additionally includes a prompt for entering a panoramic photo shooting mode, for example, a shortcut 35 of the panoramic photo shooting mode.

In this case, if the terminal detects another input operation used to enter the panoramic photo shooting mode, the terminal may display a third GUI on the display of the terminal. As shown in FIG. 18A, the third GUI displays a preview picture in the panoramic photo shooting mode.

Certainly, if incomplete human face information exists in an edge area of the preview picture (as shown in FIG. 13), the terminal may continue to display, on the display, the preview picture captured by the camera. When human face information in two adjacent preview pictures increases, as shown in FIG. 14, the terminal may display a graphical user interface that includes a prompt for entering the panoramic photo shooting mode.

All panoramic photo shooting methods used in the foregoing embodiments of the graphical user interface may be cited in descriptions of related embodiments and accompanying drawings in steps 201 to 207. Details are not described herein again.

All or some of the foregoing embodiments may be implemented through software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A panoramic photo shooting method implemented by a terminal, comprising:
   detecting an input operation to turn on a camera;
   turning on the camera in response to the input operation;
   displaying a first preview picture received from the camera;
   determining based on the first preview picture whether to switch the camera to a panoramic photo shooting mode;
   upon determining to switch the camera to the panoramic photo shooting mode, displaying, in the first preview picture, a prompt for entering the panoramic photo shooting mode, wherein the prompt recommends the panoramic photo shooting mode to a user, and wherein the prompt comprises a shortcut for entering the panoramic photo shooting mode;
detecting a second input operation to enter the panoramic photo shooting mode; and
displaying, in response to the second input operation, a second preview picture in the panoramic photo shooting mode.

2. The panoramic photo shooting method of claim 1, wherein after displaying the first preview picture, the panoramic photo shooting method further comprises:
determining whether incomplete human face information exists in an edge area of the first preview picture, wherein a first boundary of the edge area overlaps a second boundary of the first preview picture, and wherein the edge area is less than a preset value; and
displaying, in the first preview picture, the prompt for entering the panoramic photo shooting mode in response to determining that the incomplete human face information exists in the edge area.

3. The panoramic photo shooting method of claim 2, further comprising:
determining that the incomplete human face information does not exist in the edge area of the second preview picture;
displaying a third preview picture received from the camera, wherein the third preview picture is a preview frame adjacent to the second preview picture;
identifying that human face information in the third preview picture increases in comparison with second human face information in the second preview picture; and
displaying, in the third preview picture, the prompt for entering the panoramic photo shooting mode.

4. The panoramic photo shooting method of claim 2, wherein determining whether incomplete human face information exists in the edge area of the preview picture comprises:
searching for human eye information in the edge area;
determining that incomplete human face information exists in the edge area when there is human eye information in the edge area; and
determining that the incomplete human face information does not exist in the edge area when there is no human eye information in the edge area.

5. The panoramic photo shooting method of claim 2, wherein determining whether incomplete human face information exists in the edge area of the preview picture comprises:
performing mirror symmetry on the edge area to obtain a mirror area, wherein an image in the mirror area is a mirror image of an image in the edge area;
determining that the incomplete human face information exists in the edge area when the complete human face information exists in the mirror area; and
determining that the incomplete human face information does not exist in the edge area when the complete human face information does not exist in the mirror area.

6. The panoramic photo shooting method of claim 3, wherein after displaying the second preview picture, the panoramic photo shooting method further comprises comparing the second preview picture with the third preview picture to determine whether the human face information in the third preview picture increases.

7. The panoramic photo shooting method of claim 6, further comprising:
determining that the human face information increases when a first quantity of human faces in the third preview picture is greater than a second quantity of human faces in the second preview picture;
determining that the human face information in the third preview picture does not-increase when the first quantity of human faces is less than or equal to the second quantity of human faces;
determining that the human face information increases when a first quantity of human eyes in the third preview picture is greater than a second quantity of human eyes in the second preview picture; and
determining that the human face information in the third preview picture does not increase when the first quantity of human eyes is less than or equal to the second quantity of human eyes.

8. The panoramic photo shooting method of claim 1, wherein after displaying the first preview picture, the panoramic photo shooting method further comprises:
displaying, in the first preview picture, the prompt for entering the panoramic photo shooting mode when a quantity of human faces in the first preview picture is greater than a first threshold; and
cancelling the prompt for entering the panoramic photo shooting mode when the quantity of human faces is greater than a second threshold, wherein the second threshold is greater than the first threshold.

9. A terminal, comprising:
a display;
a camera; and
a processor coupled to the display and the camera and configured to:
detect an input operation to turn on the camera;
turn on the camera in response to the input operation;
display, on the display, a first preview picture received from the camera;
determine based on the first preview picture whether to switch the camera to a panoramic photo shooting mode;
upon determining to switch the camera to the panoramic photo shooting mode, display, in the first preview picture, a prompt for entering the panoramic photo shooting mode, wherein the prompt recommends the panoramic photo shooting mode to a user, and wherein the prompt comprises a shortcut for entering the panoramic photo shooting mode;
detect a second input operation to enter the panoramic photo shooting mode; and
display, in response to the second input operation, a second preview picture in the panoramic photo shooting mode on the display.

10. The terminal of claim 9, wherein the processor is further configured to:
determine whether incomplete human face information exists in an edge area of the first preview picture, wherein a first boundary of the edge area overlaps a second boundary of the first preview picture, and wherein the edge area is less than a preset value; and
display, in the first preview picture, the prompt for entering the panoramic photo shooting mode in response to determining that the incomplete human face information exists in the edge area.

11. The terminal of claim 10, wherein the processor is further configured to:

display, on the display, a third preview picture received from the camera, wherein the third preview picture is a preview frame adjacent to the second preview picture; and identify that human face information in the third preview picture increases in comparison with second human face information in the second preview picture; and display, in the third preview picture, the prompt for entering the panoramic photo shooting mode.

12. The terminal of claim 10, wherein the processor is further configured to:

search for human eye information in the edge area;

determine that incomplete human face information exists in the edge area when there is human eye information in the edge area; and determine that the incomplete human face information does not exist in the edge area when there is no human eye information in the edge area.

13. The terminal of claim 10, wherein the processor is further configured to:

perform mirror symmetry on the edge area to obtain a mirror area, wherein an image in the mirror area is a mirror image of an image in the edge area;

determine that the incomplete human face information exists in the edge area when the complete human face information exists in the mirror area; and determine that the incomplete human face information does not exist in the edge area when the complete human face information does not exist in the mirror area.

14. The terminal of claim 11, wherein the processor is further configured to compare the second preview picture with the third preview picture to determine whether the human face information in the third preview picture increases.

15. The terminal of claim 14, wherein the processor is further configured to:

determine that the human face information increases when a first quantity of human faces in the third preview picture is greater than a second quantity of human faces in the second preview picture;

determine that the human face information does not increase when the first quantity of human faces is less than or equal to the second quantity of human faces;

determine that the human face information in the third preview picture increases when a first quantity of human eyes in the third preview picture is greater than a second quantity of human eyes in the second preview picture; and determine that the human face information in the third preview picture does not increase when the first quantity of human eyes is less than or equal to the second quantity of human eyes.

16. The terminal of claim 9, wherein the processor is further configured to:

display, in the first preview picture, the prompt for entering the panoramic photo shooting mode when a quantity of human faces in the first preview picture is greater than a first threshold; and cancel the prompt for entering the panoramic photo shooting mode when the quantity of human faces is greater than a second threshold, wherein the second threshold is greater than the first threshold.

17. A computer program product comprising computer-executable instructions for storage on a non-transitory computer-readable medium that, when executed by a processor, cause a terminal to:

detect an input operation to turn on a camera;

turn on the camera in response to the input operation;

display a first preview picture received from the camera;

determine based on the first preview picture whether to switch the camera to a panoramic photo shooting mode;

upon determining to switch the camera to the panoramic photo shooting mode, display, in the first preview picture, a prompt for entering the panoramic photo shooting mode, wherein the prompt recommends the panoramic photo shooting mode to a user, and wherein the prompt comprises a shortcut for entering the panoramic photo shooting mode;

detect a second input operation to enter the panoramic photo shooting mode; and display, in response to the second input operation, a second preview picture in the panoramic photo shooting mode.

18. The computer program product of claim 17, wherein after displaying the preview picture, the computer-executable instructions further cause the terminal to:

determine whether incomplete human face information exists in an edge area of the first preview picture, wherein a first boundary of the edge area overlaps a second boundary of the first preview picture, and wherein the edge area is less than a preset value; and display, in the first preview picture, the prompt for entering the panoramic photo shooting mode in response to determining that the incomplete human face information exists in the edge area.

19. The computer program product of claim 18, wherein the-computer-executable instructions further cause the terminal to:

search for human eye information in the edge area;

determine that incomplete human face information exists in the edge area when there is human eye information in the edge area; and determine that the incomplete human face information does not exist in the edge area when there is no human eye information in the edge area.

20. The computer program product of claim 17, wherein after displaying the preview picture, the computer-executable instructions further cause the terminal to:

display, in the first preview picture, the prompt for entering the panoramic photo shooting mode when a quantity of human faces in the first preview picture is greater than a first threshold; and cancel the prompt for entering the panoramic photo shooting mode when the quantity of human faces is greater than a second threshold, wherein the second threshold is greater than the first threshold.

* * * * *

UNITED STATES PATENT AND TRADEMARK OFFICE
CERTIFICATE OF CORRECTION

PATENT NO. : 11,108,953 B2  
APPLICATION NO. : 16/639655  
DATED : August 31, 2021  
INVENTOR(S) : Chen Dong, Xin Ding and Wenmei Gao Page 1 of 1

It is certified that error appears in the above-identified patent and that said Letters Patent is hereby corrected as shown below:

In the Claims

Claim 7, Column 22, Line 8: "does not-increase when" should read "does not increase when"

Signed and Sealed this  
Fourth Day of January, 2022

Drew Hirshfeld  
*Performing the Functions and Duties of the  
Under Secretary of Commerce for Intellectual Property and  
Director of the United States Patent and Trademark Office*